US011150263B2

(12) United States Patent
Miki et al.

(10) Patent No.: US 11,150,263 B2
(45) Date of Patent: Oct. 19, 2021

(54) MEASUREMENT DEVICE AND MEASUREMENT SYSTEM

(71) Applicant: SEIKO EPSON CORPORATION, Tokyo (JP)

(72) Inventors: Chitoshi Miki, Kawasaki (JP); Hidehiko Sekiya, Kawasaki (JP); Yoshihiro Kobayashi, Komagane (JP)

(73) Assignee: Seiko Epson Corporation, Tokyo (JP)

( * ) Notice: Subject to any disclaimer, the term of this patent is extended or adjusted under 35 U.S.C. 154(b) by 125 days.

(21) Appl. No.: 16/712,796

(22) Filed: Dec. 12, 2019

(65) Prior Publication Data

US 2020/0191824 A1    Jun. 18, 2020

(30) Foreign Application Priority Data

Dec. 14, 2018    (JP) .............................. JP2018-234840

(51) Int. Cl.
*G01P 15/00*    (2006.01)
*G06F 16/2455*    (2019.01)

(52) U.S. Cl.
CPC ........ *G01P 15/00* (2013.01); *G06F 16/24568* (2019.01)

(58) Field of Classification Search
CPC .... G01P 15/00; G06F 16/24568; G01G 19/03
See application file for complete search history.

(56) References Cited

U.S. PATENT DOCUMENTS

2016/0238438 A1*    8/2016    Chen ................... G01M 5/0033

FOREIGN PATENT DOCUMENTS

| JP | 2004-252520 | 9/2004 |
| JP | 2017-058177 | 3/2017 |
| JP | 2018-092392 | 6/2018 |
| JP | 2018-141659 | 9/2018 |

* cited by examiner

*Primary Examiner* — Manuel L Barbee
(74) *Attorney, Agent, or Firm* — Workman Nydegger

(57) ABSTRACT

Provided is a measurement device including a data acquisition unit that acquires a data stream obtained in time series by a first sensor provided in a structure, and representing impact given to the structure by a movement of a moving object, and a processing unit that obtains a covariance based on the data stream and detects a timing of the impact given to the structure by the movement of the moving object, based on the covariance.

17 Claims, 21 Drawing Sheets

FIG. 8

| METHOD | PROCESSING |
|---|---|
| COVARIANCE | · COVARIANCE BETWEEN DATA STREAMS OF ACCELERATION FROM PLURALITY OF SENSORS PROVIDED AT DIFFERENT POSITIONS<br>· COVARIANCE BETWEEN DATA STREAM OF ACCELERATION FROM SENSOR AND DATA STREAM OF SPEED DETERMINED FROM DATA STREAM OF ACCELERATION |
| SELF-COVARIANCE | COVARIANCE BETWEEN DATA STREAMS OF ACCELERATION IN DIFFERENT SECTIONS FROM SAME SENSOR |
| SELF-COVARIANCE OF SAME DATA STREAMS | COVARIANCE BETWEEN DATA STREAMS OF ACCELERATION IN SAME SECTION FROM SAME SENSOR |
| SQUARE ENVELOPE | VALUE OBTAINED BY SQUARING ENVELOPE OF AMPLITUDE OF DATA STREAM OF ACCELERATION FROM SENSOR |

FIG. 9

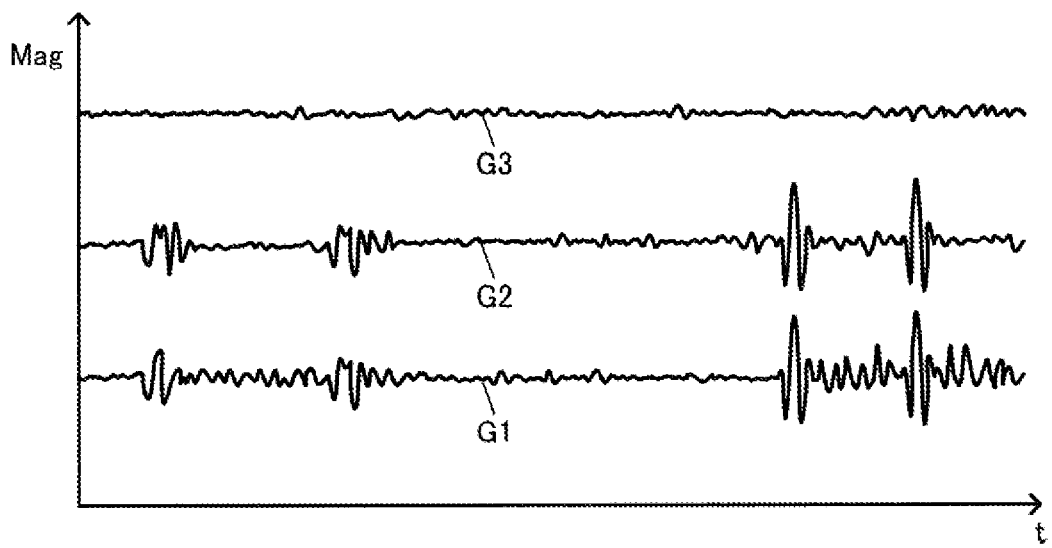

MEASUREMENT DEVICE AND MEASUREMENT SYSTEM

The present application is based on, and claims priority from JP Application Serial Number 2018-234840, filed Dec. 14, 2018, the disclosure of which is hereby incorporated by reference herein in its entirety.

BACKGROUND

1. Technical Field

The present disclosure relates to a measurement device, a measurement system, or the like.

2. Related Art

As a method for estimating a weight of a moving object such as a vehicle which moves on a structure such as a bridge, weigh-in-motion (WIM) is known. By measuring the weight of the vehicle moving on the bridge with the WIM, it is possible to measure and monitor how many, and how heavy vehicles have passed through the structure such as a bridge, or it is possible to measure and monitor passage of overloaded vehicles. As related art of the measurement device using such WIM, for example, there is a technique disclosed in JP-A-2017-58177.

The measurement device disclosed in JP-A-2017-58177 performs filter processing on acceleration data from an acceleration sensor such that an acceleration component due to the passage of an axle of a vehicle clearly appears. Specifically, high-pass filter processing for passing an acceleration having a frequency component of 25 Hz or more is performed. This high-pass filter is realized by a finite impulse response (FIR) filter. Also, in JP-A-2017-58177, emphasis filter processing with differential filters, for example, a 2-neighbor Laplacian filter or the like is performed in order to improve clarity of the acceleration component.

However, in the filter processing with the differential filters such as a high-pass filter or a 2-neighbor Laplacian filter, the acceleration of impact given to the structure due to the movement of the vehicle cannot be sufficiently clarified with respect to other acceleration signals or the like, thus it was difficult to accurately detect a timing of the impact given to the structure by the movement of the vehicle without omission.

SUMMARY

An aspect of the present disclosure relates to a measurement device including a data acquisition unit acquiring a data stream that is obtained in time series by a first sensor provided in a structure and that represents an impact given to the structure by a movement of a moving object, and a processing unit obtaining a covariance based on the data stream and detecting a timing of the impact given to the structure by the movement of the moving object, based on the covariance.

BRIEF DESCRIPTION OF THE DRAWINGS

FIG. 8 is an explanatory diagram for explaining a method according to the present embodiment which uses a covariance.

FIG. 9 is a diagram illustrating waveforms of impact acceleration on G1, G2, and G3 when a moving object travels on G1.

DESCRIPTION OF EXEMPLARY EMBODIMENTS

Hereinafter, a description will be made with regard to the present embodiment. The embodiment described below does not unreasonably limit the content described in the appended claims. Also, not all of the configurations described in the embodiment are essential configuration requirements.

1. Measurement Device

Figure 1:
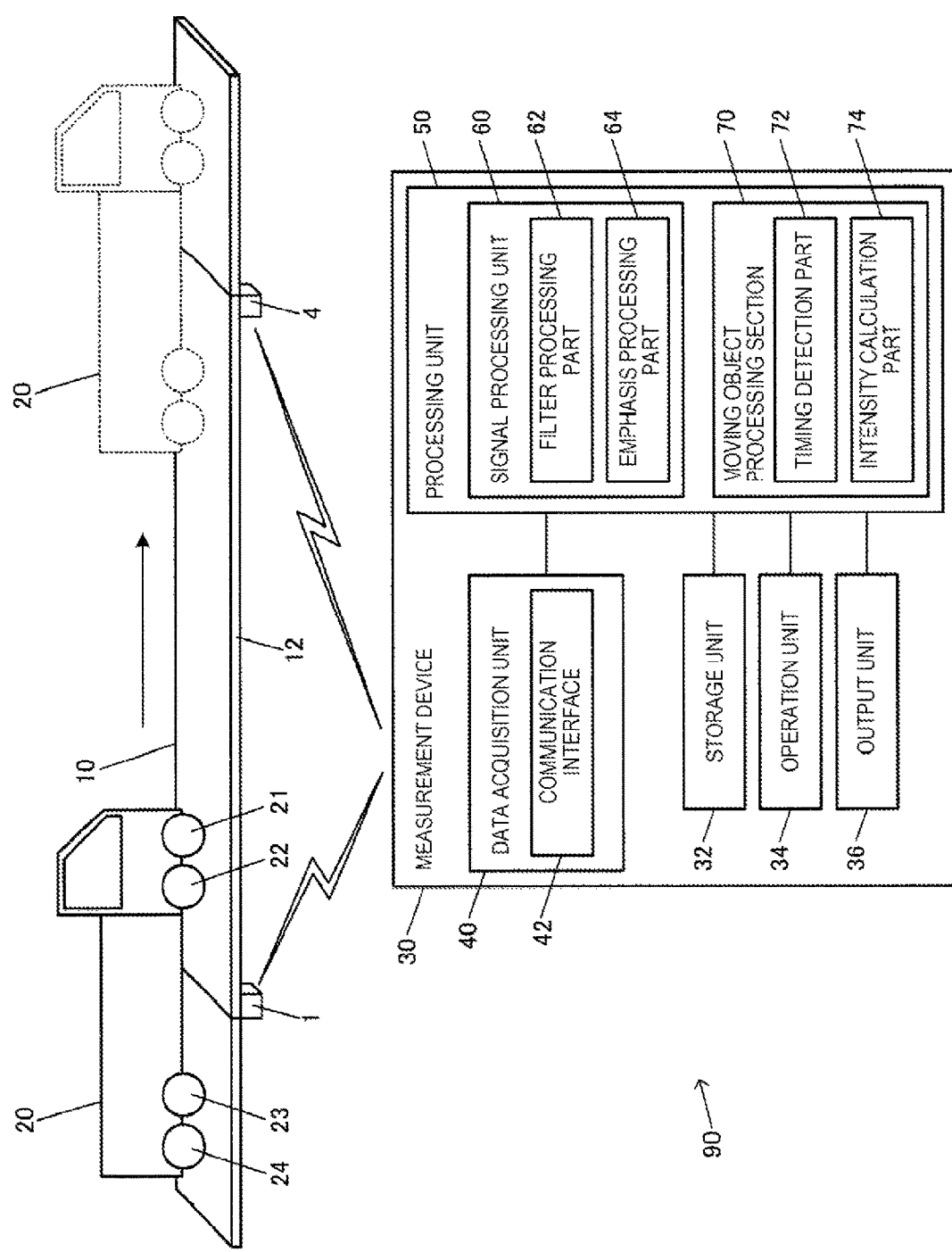
FIG. 1 is a diagram illustrating a configuration example of a measurement device and a measurement system according to the present embodiment.
Figure 2:
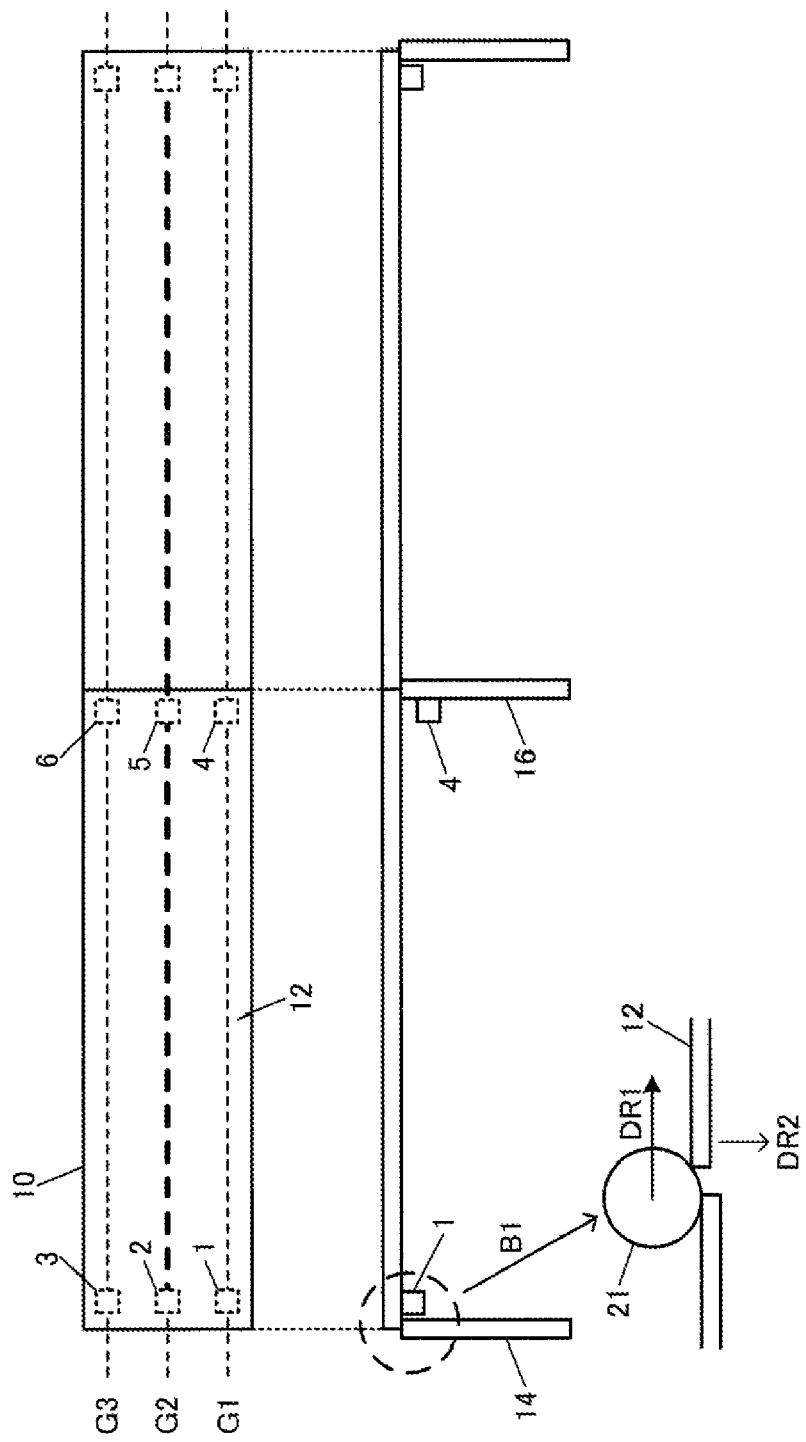
FIG. 2 is an explanatory diagram for explaining detection of impact acceleration by an arrangement of sensors or a sensor.

FIG. 1 illustrates a configuration example of a measurement device 30 of the embodiment. FIG. 2 is an explanatory diagram for explaining detection of impact acceleration by an arrangement of sensors or a sensor. The measurement device 30 of the embodiment includes a data acquisition unit 40 and a processing unit 50. The measurement device 30 may include a storage unit 32, an operation unit 34, and an output unit 36. A measurement system 90 of the embodiment includes the measurement device 30 and sensors 1, 2, 3, 4, 5, and 6 provided in a structure. The structure is, for example, a bridge 10 or a bridge floor 12 through which a vehicle 20, which is a moving object, passes. The bridge floor 12 a floor plate and supported by bridge piers 14 and 16. The vehicle 20 has four axles 21, 22, 23, and 24, and is an automobile such as a truck.

As illustrated in FIG. 1, the vehicle 20 moves on an upper surface side of the bridge floor 12. The sensors 1, 2, 3, 4, 5, and 6 are provided on either a lower surface side of the bridge floor 12 or the bridge piers 14 and 16. Specifically, in FIG. 2, the sensors 1, 2, and 3 are provided on a lower surface of end portions of the bridge floor 12, and the sensors 4, 5, and 6 are provided on a side surface of an upper portion of the bridge pier 16. Alternatively, the sensors 1, 2, 3, 4, 5, and 6 may be provided in bridge floor coupling portions on the upper portion of the bridge piers 14 and 16. Alternatively, the sensors 1, 2, 3, 4, 5, and 6 may be provided on the side surfaces of the bridge piers 14 and 16, and the sensors 1, 2, 3, 4, 5, and 6 may be provided on the lower surface of the end portions of the bridge floor 12. Positions of installing the sensors 1, 2, 3, 4, 5, and 6 are positions in which impact acceleration by the vehicle 20 entering the bridge floor 12 can be efficiently detected. In the embodiment, the sensors 1 to 6 are provided in a passing area through which the vehicle 20 passes in the structure, and the measurement device 30 detects a timing when the vehicle 20 as the moving object passes through the passing area.

The sensors 1 and 4 are disposed along a line G1 corresponding to a first lane of the vehicle 20, and the sensors 3 and 6 are disposed along a line G3 corresponding to a second lane of the vehicle 20. The sensors 2 and 5 are disposed along a line G2 between the first lane and the second lane. These sensors 1 to 6 are, for example, acceleration sensors. The acceleration sensor is, for example, a triaxial acceleration sensor capable of measuring acceleration generated in each axial direction of three axes orthogonal to each other. For example, the sensors 1 to 6 realized by the acceleration sensors are installed such that one of three detection axes of x, y, and z axes may be along a direction perpendicular to the bridge floor 12, thereby detecting impact acceleration in a direction perpendicular to the bridge floor 12. In other words, impact acceleration in a vertical direction which is a direction of gravity acceleration can be detected.

Specifically, as illustrated in B1 of FIG. 2, the axle 21 of the vehicle 20 enters the bridge floor 12 in a direction of DR1. When the axle 21 collides with a portion having a discontinuous shape of a joint of a bridge floor and a road surface adjacent to each other when entering the bridge floor 12, impact acceleration is generated. That is, impact in a direction of the DR2 in FIG. 2 is given to the bridge floor 12 which is a structure, by the movement of the vehicle 20, and sensors 1 to 6 detect the acceleration of the impact in the direction of the DR2. Thus, the axle of the vehicle 20 can be detected.

In this embodiment, the structure is mainly described as the bridge 10 or the bridge floor 12, and the moving object is mainly described as a vehicle 20 such as an automobile. However, the structure is not limited to the bridge 10 or the bridge floor 12 as long as the structure is displaced by the weight of the moving object. The moving object is not limited to the vehicle 20 such as an automobile as long as the moving object moves on the structure while applying a load to the structure. The sensors 1 to 6 may be sensors capable of detecting impact given to the structure by the movement of the moving object, and are not limited to acceleration sensors. For example, the sensor may be a pressure sensor, a vibration sensor, or a strain sensor. Further, in this embodiment, as illustrated in FIG. 2, when six sensors 1 to 6 are mainly provided at the entry and exit positions of each traveling lane and the center line for the structure having a traveling lane of two lanes, but the number of sensors is not limited to this and is optional.

The data acquisition unit 40 of the measurement device 30 acquires data streams in time series from the sensors 1 to 6. Specifically, data streams of acceleration detected by the sensors 1 to 6 are acquired. The data acquisition unit 40 can be realized by, for example, a communication interface 42. The communication interface 42 performs communication with the sensors 1 to 6 according to, for example, a predetermined communication standard. The communication interface 42 can be realized by hardware such as a circuit device for communication or a program for communication. For example, the communication interface 42 acquires data streams from the sensors 1 to 6 by wireless or wired communication. Specifically, the communication interface 42 acquires data streams of acceleration or the like outputted by the sensors 1 to 6 through a radio network of a portable telephone or a communication network such as the Internet. Thus, the data acquisition unit 40 acquires a data stream of acceleration or the like by wireless or wired communication through the communication interface 42. The communication interface 42 may be an interface of USB or an interface of an SD memory card or the like. For example, the data streams of acceleration or the like detected by the sensors 1 to 6 are collected, and the collected data streams are written in a portable memory such as a USB memory or an SD memory card. Then, the communication interface 42 reads the data streams collected from the portable memory to acquire the data stream of acceleration or the like. The acquisition of the data stream by the data acquisition unit 40 may be an acquisition of the data stream via such a portable memory.

The storage unit 32 stores various kinds of data or programs necessary for processing of the processing unit 50. The processing unit 50 performs various kinds of processing based on data or programs stored in the storage unit 32. The storage unit 32 can be realized by, for example, a semiconductor memory such as a RAM or a hard disk drive.

The operation unit 34 is used for inputting operation information by the user. The measurement device 30 performs various measurement processing based on the operation information input by the operation unit 34. The output unit 36 outputs measurement results from the measurement device 30. The output unit 36 can be realized by a display device such as a liquid crystal display or an organic EL display.

The processing unit 50 is a processor that performs various processing. For example, each processing performed by the processing unit 50 can be realized by a processor that operates based on information such as a program or the like, and by a memory that stores information such as a program. In the processor, for example, functions of each part may be realized by individual hardware, or functions of each part may be realized by integrated hardware. For example, the processor includes hardware, and the hardware may include a circuit that processes a digital signal or a circuit that processes an analog signal. For example, the processor may be configured by a circuit device which is one or more ICs mounted on a circuit board. The processor may be, for example, a central processing unit (CPU). However, the processor is not limited to CPU, various processors such as a digital signal processor (DSP) can be used. Further, the processor may be a hardware circuit by an ASIC.

The processing unit 50 includes a signal processing section 60 and a moving object processing section 70. The signal processing section 60 executes various digital signal processing and includes a filter processing part 62 and an emphasis processing part 64. The filter processing part 62 performs filter processing such as bandpass filter processing on the data stream of acceleration or the like which will be described later. The filter processing can be realized by, for example, a finite impulse response (FIR) digital filter.

The emphasis processing part 64 performs processing of emphasizing the impact acceleration. For example, the emphasis processing part 64 executes emphasis processing for separating the waveform of the impact given to the structure due to the movement of the moving object from noise signals such as vibration of the structure or environmental sound. Specifically, the emphasis processing part 64 performs emphasis processing on the data stream after filter processing such as bandpass filter processing by the filter processing part 62. For example, the emphasis processing part 64 performs processing for improving an S/N ratio between the impact acceleration and other acceleration signals which are noises by statistical processing, thereby facilitating detection of the impact acceleration. For example, the emphasis processing part 64 obtains a covariance based on the data stream of acceleration or the like as described later, to realize emphasis processing of the impact acceleration.

The moving object processing section 70 executes various kinds of processing on a moving object such as a vehicle, and includes a timing detection part 72 and an intensity calculation part 74. The timing detection part 72 performs processing of detecting a timing of impact given to the structure by the movement of the moving object. For example, the timing detection part 72 detects a passing timing of the moving object, based on a signal subjected to the emphasis processing by the emphasis processing part 64. For example, when the sensors 1 to 6 are provided in a passing area of the moving object in the structure, the timing detection part 72 detects a timing when the moving object passes through the passing area. Specifically, the timing detection part 72 detects the impact timing corresponding to the time when the impact is generated, by detecting a peak of the signal of the impact acceleration that has undergone the emphasis processing.

The intensity calculation part 74 performs calculation processing of obtaining an intensity of the impact given to the structure by the movement of the moving object. For example, the intensity calculation part 74 obtains an intensity of the impact by detecting an amplitude of the waveform of the impact acceleration or by calculating energy of the impact. Specifically, the intensity calculation part 74 obtains an intensity of the impact at the timing of the impact on the structure by the movement of the moving object. For example, the intensity calculation part 74 obtains an amplitude of the impact acceleration in a peak section of the impact acceleration or energy, as the intensity of the impact.

For example, the impact generated due to the movement of the moving object is the impact acceleration of the axle of the moving object. The moving object processing section 70 outputs a generation time of the impact acceleration which is the timing of the impact, and information on the intensity of the impact acceleration. For example, the positions where the acceleration sensors such as the sensors 1 to 6 are installed are both end portions of the structure in a traveling direction. For example, the acceleration sensors are installed at end portions on an entry side and at end portions on an exit side of the structure. Then, a power spectrum band of the impact acceleration is extracted by the bandpass filter processing. For example, in the embodiment, a plurality of acceleration sensors are installed in a width direction of the structure. The emphasis processing part 64 calculates a covariance of impact response acceleration from the plurality of acceleration sensors arranged in the width direction. The timing detection part 72 detects a peak time of a covariance as a moving timing of the moving object. For example, the peak time of the covariance is determined as the passing timing when the moving object passes through the passing area. The intensity calculation part 74 calculates the intensity from the impact acceleration at the time corresponding to a peak width of the covariance.

Alternatively, the emphasis processing part 64 obtains a self-covariance of impact response acceleration from the acceleration sensor installed at one end portion of the structure. The timing detection part 72 detects the peak time of the self-covariance as the moving timing of the moving object. For example, the timing detection part 72 determines the peak time of covariance as the passing timing of the passing area set at one end portion of the structure. Then, the intensity calculation part 74 calculates the intensity from the impact acceleration at the time corresponding to the peak width of a self-covariance.

Alternatively, the emphasis processing part 64 obtains a self-covariance in the same section of impact response acceleration from the acceleration sensor installed at one end portion. The same section is an area having the same data. That is, the emphasis processing part 64 obtains the self-covariance between the same data streams output by the acceleration sensor. The timing detection part 72 determines the peak time of the self-covariance as the moving timing of the moving object. The intensity calculation part 74 obtains a peak of the self-covariance as the intensity of the impact acceleration.

Alternatively, the emphasis processing part 64 obtains the square envelope of an amplitude waveform of the impact detected by the acceleration sensor installed at one end portion. The timing detection part 72 determines the peak time of the square envelope of the amplitude waveform as the moving timing of the moving object. Then, the intensity calculation part 74 obtains a peak of the square envelope of the amplitude waveform as the intensity of the impact acceleration. The emphasis processing part 64 adjusts a length of a data section to be subjected to the statistical processing, such that the peak waveform subjected to the emphasis processing becomes a single-peak shape. Then, the length of the data section is adjusted to the smallest section length in which the peak waveform becomes the single-peak shape.

Figure 3:
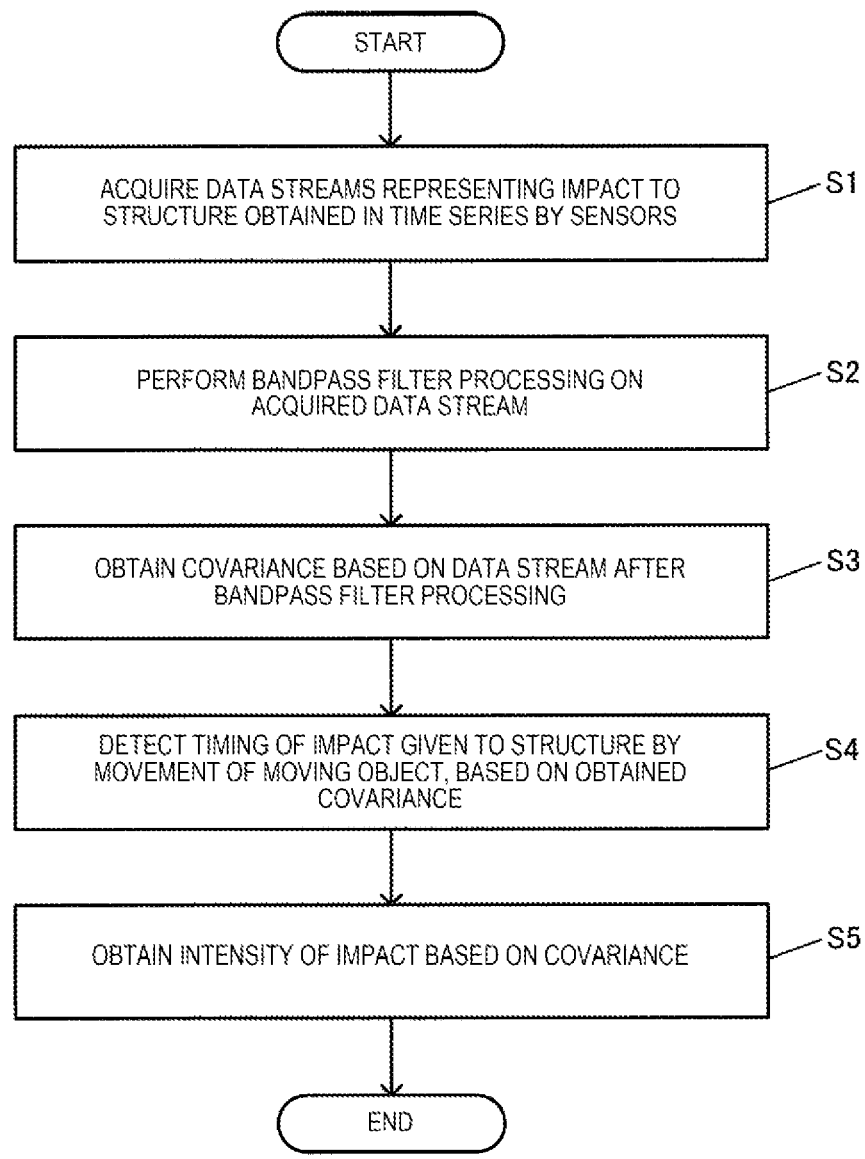
FIG. 3 is a flowchart for explaining processing of the present embodiment.

FIG. 3 is a flowchart for explaining processing of the embodiment. First, the data acquisition unit 40 acquires data streams representing impact to a structure obtained in time series by the sensors 1 to 6 (Step S1). The acquired data stream is a stream of data representing the impact given to the structure by the movement of the moving object, for example, a data stream of impact acceleration. For example, when the sensors 1 to 6 are acceleration sensors, a data acquisition unit 40 acquires data streams of acceleration output in time series by the sensors 1 to 6. For example, the data acquisition unit 40 acquires the data stream through the communication interface 42. The processing unit 50 performs bandpass filter processing on the acquired data stream (Step S2). Specifically, the filter processing part 62 performs FIR bandpass filter processing. The processing unit 50 obtains a covariance based on the data stream subjected to the bandpass filter processing (Step S3). The covariance may be a covariance between different types of data streams such as a data stream of acceleration and a data stream of a velocity, or may be a self-covariance such as the covariance between data streams of acceleration. The self-covariance may be a covariance of data streams of the same section. For example, the self-covariance may be one between the data streams of the same acceleration in the same section. Alternatively, the square envelope of the amplitude waveform of the impact may be obtained as the self-covariance.

Next, the processing unit 50 detects the timing of the impact given to the structure by the movement of the moving object based on the obtained covariance (Step S4). Thus, the timing when the moving object passes through the passing area which is an area where the sensor is installed can be detected. The processing unit 50 obtains the intensity of the impact based on the covariance (Step S5). For example, in a case of normal covariance, the processing unit 50 obtains the intensity of the impact from the impact acceleration at the time corresponding to the peak width of the covariance. In a case of a self-covariance of data streams in different sections, the intensity of the impact is obtained from the impact acceleration at the time corresponding to the peak width of the self-covariance. In a case of a self-covariance of the data streams in the same section, the intensity of the impact is obtained from the amplitude of a peak of the self-covariance.

Although the weight of the moving object moving on the structure is obtained in the WIM, various methods such as methods disclosed in JP-A-2017-58177 described above can be adopted as the methods for obtaining the weight of the moving object. For example, the acceleration sensor is installed in a first passing area at an entry end of the structure and a second passing area at an exit end. A first passing timing at which the moving object passes through the first passing area and a second passing timing at which the moving object passes through the second passing area are detected by the processing described in FIG. 3. Specifically, the passing timing of each axle of the moving object in the first and second passing areas is detected. The passage timing is the passage time. By detecting the axle of the moving object, for example, the moving object passing the first passing area and the moving object passing the second passing area can be specified to be the same moving object. The weight of the moving object is calculated by calculating displacement which is a deflection amount in the vertical direction of the structure between the first passing timing and the second passing timing. For example, a sensor for measuring displacement, such as an acceleration sensor or a strain sensor is provided between the first passing area as the entry end of the structure and the second passing area as the exit end, and displacement as the deflection amount in the vertical direction of the structure is obtained using the sensor for measuring displacement. For example, the sensor for measuring displacement may be provided near a center of the first passing area and the second passing area, or a plurality of sensors for measuring displacement may be provided between the first passing area and the second passing area.

In order to accurately obtain the weight of the moving object moving on such structure, it is desirable to accurately detect the passing timing of the moving object in the passing area without omission. In the embodiment, a covariance that is a statistical value is used for detecting the passing timing. For example, the covariance being the statistic value is used to perform emphasis processing of axle response. Then bandpass filter processing is performed on the data stream from the acceleration sensor, and emphasis processing is performed on the data stream subjected to the bandpass filter processing using a covariance. By performing such emphasis processing, the impact acceleration given to the structure due to the movement of the moving object is separated from noise signals such as vibration of the structure and environmental sound. Thus, the passing timing of the moving object can be accurately detected without omission.

Figure 4:
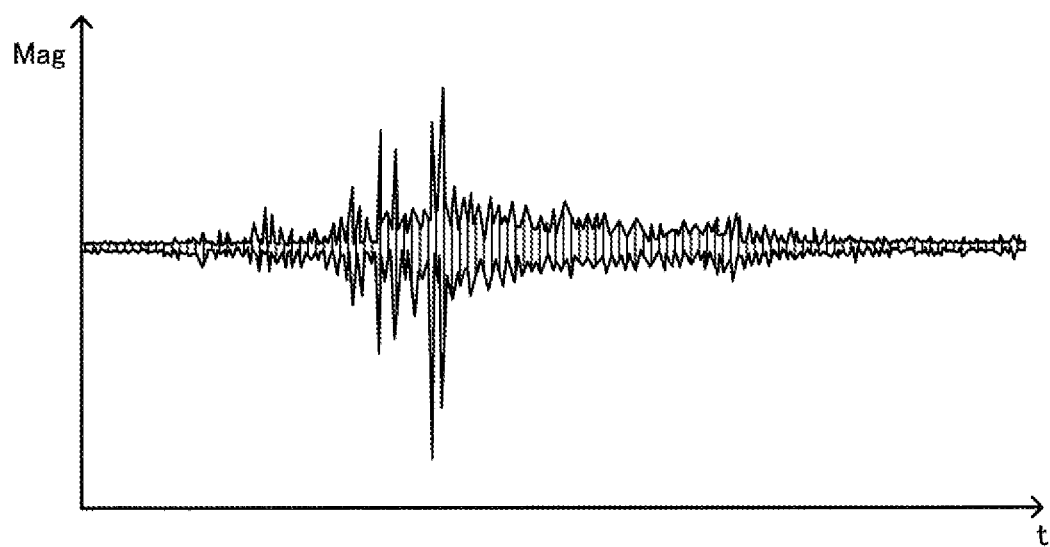
FIG. 4 is a diagram illustrating a waveform of impact acceleration when a moving object enters.

For example, FIG. 4 illustrates an example of the waveform of the impact acceleration when the moving object enters. t on a horizontal axis represents time, and Mag on a vertical axis represents the magnitude of the acceleration. The moving object is the vehicle 20 such as a truck having four axles of 21, 22, 23, and 24 as illustrated in FIG. 1. Four peaks are generated in the waveform of the impact acceleration corresponding to the four axles 21, 22, 23, and 24. The four peaks correspond to the passing timings of the axles 21, 22, 23, and 24 in the passing area. However, in FIG. 4, the S/N ratio is lowered due to noise such as vibration of the structure and environmental sound such as a horn, and it is not clear whether these four peaks are impact responses by the axles 21, 22, 23, and 24. Thus, for more clearly observing the impact acceleration which is the acceleration of the impact response by the axle, signal processing is required. For example, since it is difficult to observe the impact acceleration on the bridge 10 due to the natural resonance frequency and the like, it is necessary to improve the S/N ratio between the impact acceleration and other noises in order to detect the waveform of the impact acceleration by the axle.

Figure 5:
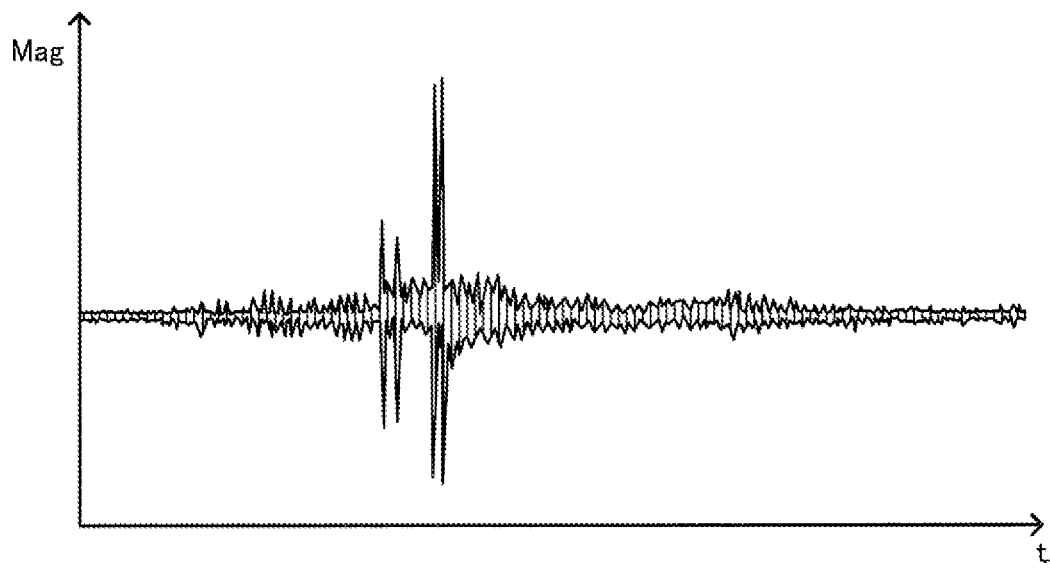
FIG. 5 is a diagram illustrating a waveform of impact acceleration after bandpass filter processing.
Figure 24:
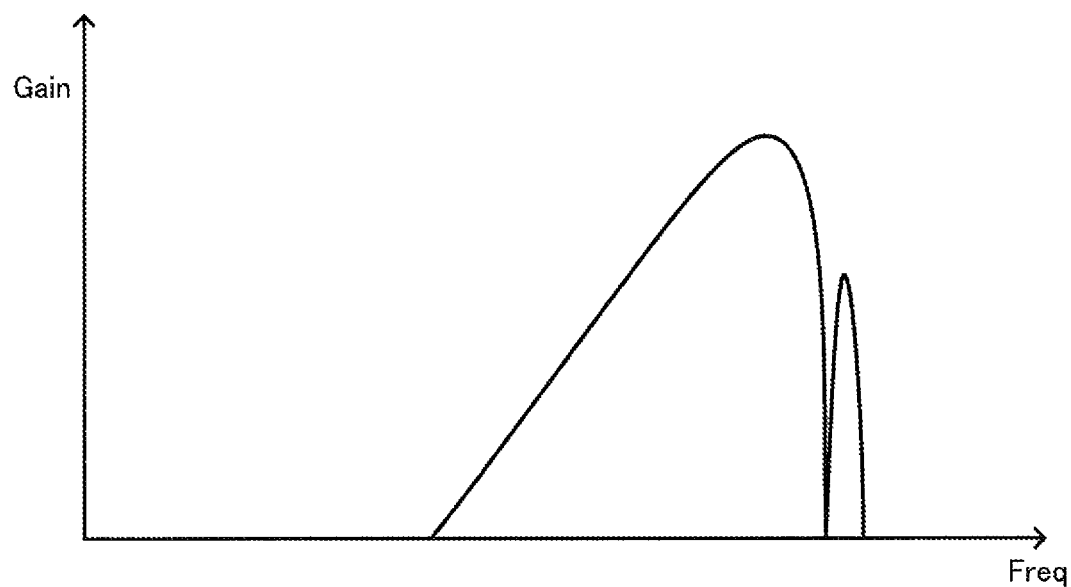
FIG. 24 is a diagram illustrating frequency characteristics of a bandpass filter.

FIG. 5 is a diagram illustrating the waveform of the impact acceleration subjected to the bandpass filter processing. For example, by performing the bandpass filter processing of frequency characteristics as illustrated in FIG. 24 described later on the data stream from an acceleration sensor, the waveform of the impact acceleration in FIG. 4 becomes the waveform as illustrated in FIG. 5. That is, by performing the bandpass filter processing for allowing signals of a predetermined frequency bandwidth to pass through (for example, 40 Hz to 100 Hz), the peak of the impact response by the axle becomes clearer as illustrated in FIG. 5, and the S/N ratio of the impact acceleration to the noise other than the impact acceleration can be improved.

In the embodiment, the emphasis processing using a covariance is performed on the data stream subjected to the bandpass filter processing. That is, in the embodiment, a statistical method is used as a method for emphasizing the waveform of the impact acceleration. The reason why the statistical method can be used is that the detection of the impact response of the axle is aimed at detecting the passing timing of the axle, such that the detection is not required to be based on the physical quantity of the signal.

Figure 6:
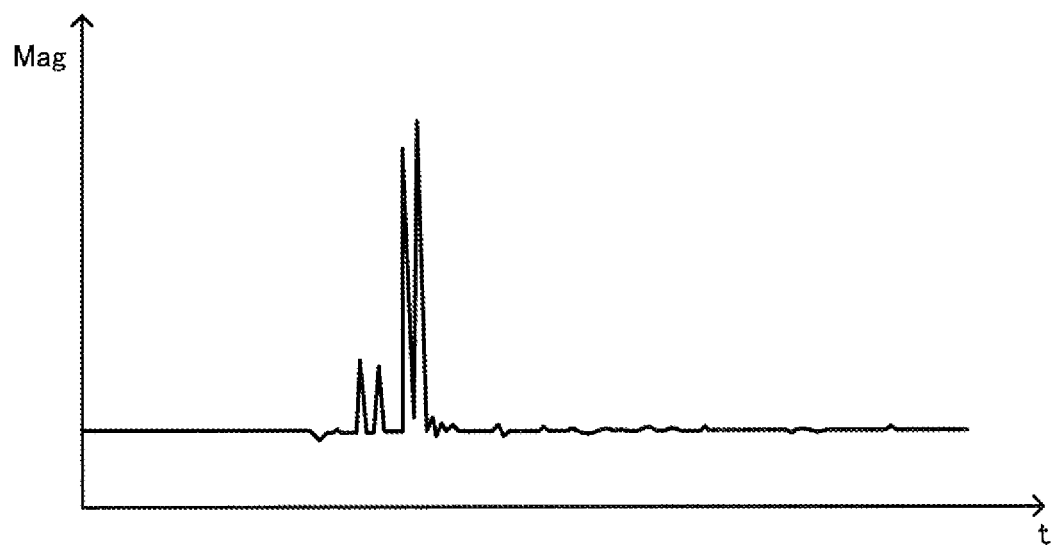
FIG. 6 is a diagram illustrating a waveform of a covariance of impact acceleration.

FIG. 6 is a diagram illustrating the waveform of a covariance of the impact acceleration. Here, as a covariance, a self-covariance between data streams in the same section as described later is used. As illustrated in FIG. 6, four peaks corresponding to four axles are clearly detected by obtaining the covariance. Thus, the passing timing in the passing area of the four axles can be accurately detected without omission.

Figure 7:
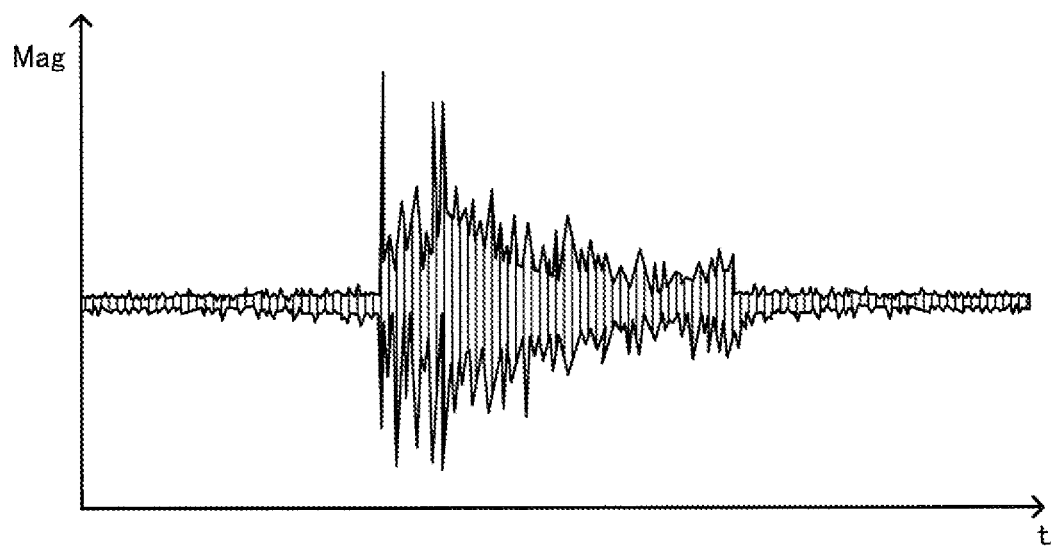
FIG. 7 is a diagram illustrating a waveform of impact acceleration after 2-neighbor Laplacian filter processing.

For example, FIG. 7 is a diagram illustrating a waveform of impact acceleration when 2-neighbor Laplacian filter processing is performed. In the methods of the related art, for example, the S/N ratio of the impact acceleration to noise is improved by performing high-pass filter processing on the data stream of the acceleration, and by the 2-neighbor Laplacian filter, amplitude difference between the impact response of a relatively small amplitude and the impact response of a large amplitude is reduced, thereby facilitating axle detection using a threshold. However, as illustrated in FIG. 7, the detection of the peak of the impact response by the axle is insufficient in the method using the 2-neighbor Laplacian filter. On the other hand, according to the method of the embodiment using the covariance, the peak of the impact response by the axle can be clearly detected as illustrated in FIG. 6, and the passing timing of the axle can be accurately detected without omission.

As described above, the measurement device 30 according to the embodiment includes the data acquisition unit 40 and the processing unit 50 as illustrated in FIG. 1. The data acquisition unit 40 acquires the data stream obtained in time series by the first sensor provided in the structure and representing the impact given to the structure by the movement of the moving object. For example, the moving object is the vehicle 20, and the first sensor is the sensor 1 or the like. For example, due to the collision of the axle or the like of the moving object with the structure by the movement of the moving object, the impact is given to the structure. Vibration or the like of the structure due to the impact is detected by the first sensor as the impact acceleration, thereby outputting from the first sensor as the data stream representing the impact of the structure. Then, the processing unit 50 obtains a covariance based on the data stream from the first sensor, and to detect the timing of the impact given to the structure by the movement of the moving object based on the covariance. For example, timing when the moving object passes through the passing area provided with the first sensor is detected. By using the covariance in this way, the peak of the impact waveform can be clearly distinguished from the other noises and detected as illustrated in FIG. 6. The peak of the impact waveform corresponds to the timing of the impact given to the structure by the movement of the moving object. Accordingly, according to the embodiment, the timing of the impact given to the structure by the movement of the moving object can be accurately detected without omission.

For example, since the 2-neighbor Laplacian filter in FIG. 7 only changes the waveform by changing the frequency characteristic of the impact acceleration waveform, it is difficult to properly extract the peak of the impact without omission. On the other hand, in a case of using the covariance, a large value is obtained in a section linearly changed like the peak of the impact, and a small value is obtained in a section finely changed like noises because the amount of change is averaged in the section. Accordingly, the peak of the impact can be clearly extracted as illustrated in FIG. 6, and appropriate emphasis processing on the peak of the impact can be realized as compared with FIG. 7.

As a statistical value for digitizing correlation between data streams, there is a correlation coefficient of Pearson or the like, for example, but in the correlation coefficient of Pearson, the value of the coefficient is standardized to 0 to 1. Therefore, it is not preferable as processing for emphasizing the peak of the impact. In this regard, in the covariance, there is no standardization like the correlation coefficient of Pearson, the higher the correlation between the data streams, that is, the higher the correlation of the impact waveform, the larger the value. Thus, the emphasis processing using the covariance has an advantage of properly emphasizing the peak of the impact in comparison with statistical processing of the correlation in which standardization such as the correlation coefficient of Pearson is performed.

Further, in the embodiment, the processing unit 50 performs bandpass filter processing on the data stream to obtain the covariance based on the data stream subjected to the bandpass filter processing. For example, by performing bandpass filter processing of the frequency characteristics as illustrated in FIG. 24 described later on the data stream, the peak of the impact waveform becomes clearer as illustrated in FIG. 5, and the S/N ratio can be improved. Moreover, by obtaining the covariance based on the data stream subjected to the bandpass filter processing, it becomes possible to clearly detect the peak as illustrated in FIG. 6, and it becomes possible to accurately detect the impact timing without omission.

As the bandpass filter processing in this case, as described referring to FIG. 23 described later, the processing for passing the frequency bandwidth in which the gain of the response frequency characteristics of the impact is larger than 1 is desirable. In this way, it is possible to perform the emphasis processing based on the covariance by causing the signal in the frequency bandwidth corresponding to the vibration frequency of the impact waveform to pass through by the bandpass filter processing, thereby realizing filter processing suitable as preprocessing for emphasis processing.

Further, in the embodiment, the first sensor is provided in the passing area of the moving object in the structure. The processing unit 50 detects the timing of the impact given to the structure by the movement of the moving object to detect the timing when the moving object passes through the passing area. For example, the processing unit 50 detects the occurrence time of the impact which is the timing when the impact occurs, to detect the passing time of the moving object which is the timing when the moving object passes through the passing area. In this way, it is possible to specify a timing at which the moving object passes through the passing area, to realize various kinds of processing using the passing timing. For example, by providing a first passing area at the entry end of the structure as the passing area, and by providing a second passing area at the exit end of the structure, an entering timing of the moving object into the structure and a leaving timing of the moving object from the structure can be detected. As a result, WIM processing or the like for estimating the weight of the moving object moving on the structure can be realized.

Further, in the embodiment, the processing unit 50 performs axle detection of the moving object based on the covariance. For example, the processing unit 50 detects the timing of the impact given to the structure by the axle of the moving object, as axle detection. Alternatively, the processing unit 50 may detect the pattern of the axle of the moving object as the axle detection. For example, by detecting the patterns of the axles of the moving object at the entry end and exit end of the structure, whether the moving object entering the entry end and the moving object leaving the exit end are the same moving object may be detected. Thus, by performing the axle detecting of the moving object based on the covariance, accurate axle detection without omission becomes possible. For example, the timing of the impact given to the structure by the axle of the moving object can be detected accurately and without omission, and the weight of the moving object moving on the structure can be determined more accurately. Moreover, the pattern of the axle can be also detected more accurately.

2. Covariance and Self-Covariance

In the embodiment, a covariance is used as the emphasis processing of the impact acceleration. Hereinafter, processing of the covariance will be described in detail. FIG. 8 is an explanatory diagram for explaining a method according to the embodiment which uses a covariance. The covariance is a value indicating the relationship between two data, for example, an index value indicating the correlation between the two data. As illustrated in FIG. 8, as the covariance, a covariance in a narrow sense, a self-covariance, a self-covariance of the same data streams, and a covariance corresponding to the square envelope of the amplitude waveform can be used.

As illustrated in FIG. 8, in the embodiment, for example, the covariance in a narrow sense is obtained as the covariance. The covariance in a narrow sense is, for example, a covariance between data streams from different sensors or a covariance between data streams representing different physical quantities. Specifically, the covariance in a narrow sense includes, as illustrated in FIG. 8, the covariance between data streams of the acceleration from a plurality of sensors provided at different positions, or the covariance between the data stream of the acceleration from the sensor and the data stream of a velocity determined from the data stream of the acceleration.

For example, the data acquisition unit 40 in FIG. 1 acquires a data stream obtained in time series by the first sensor provided in the structure and a second data stream obtained in time series by a second sensor provided at a position different from the position where the first sensor is provided in the structure. As an example, the first sensor is a sensor 1 in FIG. 2, and the second sensor is a sensor 2 or a sensor 3. Alternatively, the first sensor is a sensor 4, and the second sensor is a sensor 5 or a sensor 6. The sensor 1 and the sensor 2 or the sensor 3 are provided at different positions in the structure. The sensors 1, 2 and 3 are provided in the first passing area at the entry end, for example, and can detect an entry timing which is the passing timing that is the timing when the moving object passes through the first passing area, based on the data streams from the sensors 1, 2 and 3. The sensor 4 and the sensor 5 or the sensor 6 are provided at different positions in the structure. The sensors 4, 5 and 6 are provided in the second passing area at the exit end, for example, and the exit timing which is the passage timing when the moving object passes through the second passing area, based on the data streams from the sensors 4, 5 and 6 can be detected.

In the covariance in a narrow sense, a covariance between the data stream of the acceleration from the first sensor and the data stream of the acceleration from the second sensor is obtained. Alternatively, a covariance between the data stream of the acceleration from the first sensor and the data stream of a velocity obtained by integrating the data stream of acceleration, for example, is obtained. Alternatively, a covariance between the data stream of the acceleration from the second sensor and the data stream of the velocity obtained by integrating the data stream of the acceleration, for example, is obtained.

In the embodiment, a self-covariance is obtained as a covariance as illustrated in FIG. 8. The self-covariance is a covariance between the data streams indifferent sections. The self-covariance is one of a covariance, for example, is a covariance between data streams shifted in time. Specifically, as illustrated in FIG. 8, the self-covariance is the covariance between the data streams of the acceleration in different sections from the same sensor. For example, a covariance between a data stream of an acceleration in a first section and a data stream of an acceleration in a second section of the sensor 1 in FIG. 2 is obtained as a self-covariance. Similarly, a covariance between the data stream of the acceleration in the first section of each sensor 2, 3, 4, 5, and 6 and the data stream of the acceleration in the second section of each sensor 2, 3, 4, 5, and 6 is obtained as a self-covariance. The first section and the second section are time sections that are shifted in time.

Further, in the embodiment, a self-covariance of the same data stream is obtained as covariance as illustrated in FIG. 8. The self-covariance of the same data streams is a covariance of the data streams in the same section. That is, a normal self-covariance means a covariance of the data streams in different sections, but in the embodiment, a covariance of the data streams in the same section is obtained as the self-covariance. Specifically, as illustrated in FIG. 8, a covariance of the data streams of the acceleration in the same section from the same sensor is obtained as the self-covariance of the same data stream.

Moreover, in FIG. 8, the square envelope of the amplitude waveform is obtained as a covariance. Specifically, as illustrated in FIG. 8, the square envelope of the amplitude waveform of the impact represented by the data stream of the acceleration from the sensor is obtained. The square envelope of the amplitude waveform corresponds to the self-covariance in the same section which is the self-covariance of the same data stream.

As described above, in the embodiment, the processing unit 50 obtains the self-covariance of the data streams as the covariance, and detects the timing of the impact to the structure due to the movement of the moving object based on the obtained self-covariance. For example, by obtaining the self-covariance based on the data stream from the first sensor, the peak of the impact can be detected as illustrated in FIG. 6, and the timing of the impact which is the time when the impact occurs can be detected by detecting the peak of the impact. Specifically, as illustrated in FIG. 8, the processing unit 50 obtains the covariance of the data streams in different sections from the same first sensor as the self-covariance, and detects the timing of the impact to the structure based on the obtained self-covariance. For example, by obtaining a covariance between the data stream in the first section from the first sensor and the data stream in the second section from the first sensor, a self-covariance is obtained. In this way, a covariance can be obtained by simple processing based on the data stream from the first sensor, thereby simplifying the processing and reducing the processing load.

In the embodiment, the processing unit 50 obtains the self-covariance of the data streams in the same section, as the covariance. Based on the obtained self-covariance, the timing of the impact to the structure due to the movement of the moving object is detected. Specifically, as illustrated in FIG. 8, the processing unit 50 obtains the covariance of the data streams in the same section from the same first sensor as the self-covariance, and detects the timing of impact to the structure based on the obtained self-covariance. That is, the self-covariance in a narrow sense is the covariance of the data streams in different sections, but in the embodiment, the covariance of the data streams in the same section is obtained as the self-covariance. Namely, the covariance of the same data stream is obtained as the self-covariance. In this way, since the self-covariance can be obtained by using the same data stream in the same section, the amount of data required for obtaining the covariance can be reduced. Further, in the method for obtaining the self-covariance of the data streams in the same section, for example, the intensity of the impact can be obtained by performing square root extraction (root) of the self-covariance.

In the embodiment, the processing unit 50 may obtain the square envelope of the amplitude waveform of the impact as the self-covariance. Specifically, as illustrated in FIG. 8, the processing unit 50 obtains the square envelope of the amplitude waveform of the impact obtained by the data stream from the first sensor as the self-covariance. The square envelope of the amplitude waveform is equivalent to the self-covariance of the data streams in the same section. Thus, it is possible to obtain a value same as in the self-covariance of the data streams in the same section by obtaining the square envelope of the amplitude waveform.

Further, in the embodiment, the data acquisition unit 40 acquires the second data stream obtained in time series by the second sensor provided at the position different from the position where the first sensor is provided in the structure. That is, the second data stream representing the impact of the structure caused by the movement of the moving object is acquired. Then, the processing unit 50 obtains the covariance between the first data stream and the second data stream which are data streams from the first sensor.

For example, the first sensor is the sensor 1 in FIG. 2, and the second sensor is the sensor 2 or the sensor 3. Alternatively, the first sensor is the sensor 4, and the second sensor is the sensor 5 or the sensor 6. Here, a description will be made assuming that the first sensor is the sensor 1, and the second sensor is the sensor 2. In this case, the sensor 1 as the first sensor and the sensor 2 as the second sensor are arranged side by side in a width direction orthogonal to the moving direction of the moving object. With this arrangement, the timing of the impact detected based on the data stream from the sensor 1 and the timing of the impact detected based on the data stream from the sensor 2 become the same timing. The data acquisition unit 40 acquires the first data stream obtained in time series by the sensor 1 and the second data stream obtained in time series by the sensor 2. The first and second data streams become data streams representing the impact given to the structure when the moving object passes through the passing area where the sensors 1 and 2 are installed. The processing unit 50 obtains the covariance between the first data stream from the sensor 1 and the second data stream from the sensor 2. Specifically, the processing unit 50 performs bandpass filter processing on the first and second data streams from the sensors 1 and 2, and obtains the covariance between the first and second data streams subjected to the bandpass filter processing. In this way, the covariance in a narrow sense in FIG. 8 can be obtained, and the timing of the impact can be detected based on the obtained covariance.

In the embodiment, the data stream is the data stream of the acceleration, and the processing unit 50 obtains the covariance between the data stream of the acceleration and the data stream of a velocity obtained from the data stream of the acceleration. For example, the data acquisition unit 40 acquires the data stream of the acceleration from the sensor 1. The processing unit 50 obtains the data stream of a velocity by integrating the data stream of the acceleration. Then, the covariance between the data stream of the acceleration and the data stream of the velocity is obtained, and the timing of the impact to the structure is detected. That is, the timing of the impact given to the structure is detected by the movement of the moving object in the passing area where the sensor 1 is installed. In this way, the covariance can be obtained based on the data streams of the acceleration from one sensor.

Next, the processing of the covariance in a narrow sense illustrated in FIG. 8 will be described in detail. FIG. 9 illustrates the waveforms of the impact acceleration based on the data streams of the acceleration from the sensors 1, 2, and 3 provided corresponding to the lines of G1, G2, and G3 when the moving object travels on the lane of the line G1 in FIG. 2. Since the moving object travels on the lane of the line G1 in FIG. 9, correlation between the waveform of the impact acceleration of G1 and the waveform of the impact acceleration of G2 increases. On the other hand, since the moving object is not traveling in the lane of the line G3, correlation between the waveform of the impact acceleration of G3 and the waveform of the impact acceleration of G2 is low. In the embodiment, a value representing the correlation of the waveform of the impact acceleration is obtained as the covariance, and the peak of the impact which is the peak of the axle response is detected.

The covariance is an average of products of deviations of two sets of data streams, a covariance C12 of G1-G2 can be represented as the following Equation (1), and a covariance C32 of G3-G2 can be represented by the following Equation (2). Here, the covariance C12 of the G1-G2 is a covariance between the data stream of the acceleration from the sensor 1 corresponding to G1 and the data stream of the acceleration from the sensor 2 corresponding to G2. The covariance C32 of G3-G2 is a covariance between the data stream of the acceleration from the sensor 3 corresponding to G3 and the data stream of the acceleration from the sensor 2 corresponding to G2.

$$C12 = \langle (\alpha 1_k - \langle \alpha 1_{k,n} \rangle)(\alpha 2_k - \langle \alpha 2_{k,n} \rangle) \rangle \tag{1}$$

$$C32 = \langle (\alpha 3_k - \langle \alpha 3_{k,n} \rangle)(\alpha 2_k - \langle \alpha 2_{k,n} \rangle) \rangle \tag{2}$$

In Equations (1) and (2), $\alpha 1_k$ is a data stream of the acceleration from the sensor 1 provided corresponding to G1. The $\alpha 2_k$ is a data stream of the acceleration from the sensor 2 provided corresponding to G2. The $\alpha 3_k$ is a data stream of the acceleration from the sensor 3 provided corresponding to G3. n is the section length. $\langle \alpha 1_{k,n} \rangle$ is an average of the data stream $\alpha 1_k$ at the section length n. $\langle \alpha 2_{k,n} \rangle$ is an average of the data stream $\alpha 2_k$ at the section length n. $\langle \alpha 3_{k,n} \rangle$ is an average of the data stream $\alpha 3_k$ at the section length n.

When assuming that n is an odd integer, n>3, and the covariance is the center of the section in order to eliminate phase delay due to a covariance in the covariance section, the covariances C12 and C32 are represented by the following Equations (3), (4).

$$C12_k = \frac{1}{n} \sum_{l=-\frac{n-1}{2}}^{\frac{n-1}{2}} \left( \alpha 1_{k+l} - \frac{1}{n} \sum_{i=-\frac{n-1}{2}}^{\frac{n-1}{2}} \alpha 1_{k+i} \right) \left( \alpha 2_k - \frac{1}{n} \sum_{i=-\frac{n-1}{2}}^{\frac{n-1}{2}} \alpha 2_{k+i} \right) \quad (3)$$

$$C32_k = \frac{1}{n} \sum_{i=-\frac{n-1}{2}}^{\frac{n-1}{2}} \left( \alpha 3_{k+l} - \frac{1}{n} \sum_{i=-\frac{n-1}{2}}^{\frac{n-1}{2}} \alpha 3_{k+i} \right) \left( \alpha 2_{k+l} - \frac{1}{n} \sum_{i=-\frac{n-1}{2}}^{\frac{n-1}{2}} \alpha 2_{k+i} \right) \quad (4)$$

In Equation of the covariance described above, since the deviation indicates the magnitude of dispersion with respect to the average value, the value of the covariance is larger when the data are distributed so as to be more dispersed. Accordingly, the value of the covariance becomes larger as the data in the covariance section tend to be linear. Since the waveform of the impact acceleration is white noise, periodic noise, and amplitude fluctuation of impact, the covariance becomes a correlation value indicating a tendency of linear impact amplitude as a larger value.

Figure 10:
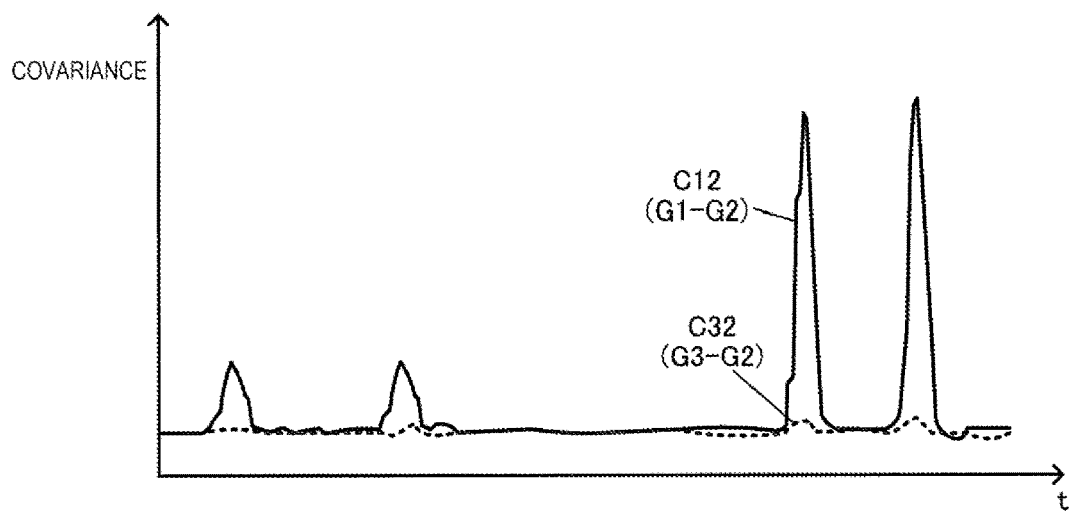
FIG. 10 is a diagram illustrating a waveform of a covariance when a moving object travels on G1.

FIG. 10 is a diagram illustrating a waveform of the covariance C12 of G1-G2 and the covariance C32 of G3-G2 when the moving object travels in the lane of the line G1. As illustrated in FIG. 10, the timing of the impact given to the structure by the movement of the moving object can be detected by obtaining the covariance C12 between the data stream of the acceleration from the sensor 1 corresponding to G1 and the data stream of the acceleration from the sensor 2 corresponding to G2. That is, the passing timing of the moving object in the passing area where the sensors 1 and 2 are installed can be detected.

In the method using the covariance in a narrow sense, a covariance between waveforms of impact acceleration of two lines of G1 and G2 is used. Specifically, a covariance between the data stream of the acceleration from the sensor 1 and the data stream of the acceleration from the sensor 2 is used. However, when evaluating the linear tendency of the waveform of the impact acceleration, it is found that the self-covariance of the waveform of the impact acceleration of one line may be used. Specifically, a self-covariance of the data streams of the acceleration from one sensor is used, for example. Even in such a self-covariance, since a dispersion value becomes larger at a straight line part of the waveform, proper emphasis processing of the peak of the impact can be realized. By using the self-covariance, there is an advantage that a required data amount can be reduced.

When the self-covariance is used, target data stream is not limited to the data stream of the acceleration. For example, the self-covariance may be used for the data stream of a velocity obtained by integrating the data stream of the acceleration, or the self-covariance may be used for the data stream of displacement obtained by integrating the data stream of a velocity.

The self-covariance $C_k$ can be represented by the following Equation (5). Equation (5) is, for example, a self-covariance between the data streams in different sections.

$$C_k = \frac{1}{n} \sum_{i=-\frac{n-1}{2}}^{\frac{n-1}{2}} \left( \alpha_k - \frac{1}{n} \sum_{i=-\frac{n-1}{2}}^{\frac{n-1}{2}} \alpha_{k+i} \right) \left( \alpha_{k+m} - \frac{1}{n} \sum_{i=-\frac{n-1}{2}}^{\frac{n-1}{2}} \alpha_{k+m+i} \right) \quad (5)$$

In the above Equation (5), $\alpha_k$ is a data stream from an optional sensor. That is, it is a data stream of an arbitrary lane. In addition, n is a section length and m is an offset of the data section. In the self-covariance in different sections, for example m>1 is satisfied. The offset m can be adjusted to an optional value. By adjusting the section length n and the offset m, the emphasis processing under the condition that the emphasis of the impact acceleration is the best becomes possible.

Further, in the embodiment, as described in FIG. 8, a self-covariance of the data streams in the same section is used. The self-covariance $C_k$ of the data streams in the same section can be represented as the following Equation (6).

$$C_k = \frac{1}{n} \sum_{i=-\frac{n-1}{2}}^{\frac{n-1}{2}} \left( \alpha_k - \frac{1}{n} \sum_{i=-\frac{n-1}{2}}^{\frac{n-1}{2}} \alpha_{k+i} \right) \left( \alpha_k - \frac{1}{n} \sum_{i=-\frac{n-1}{2}}^{\frac{n-1}{2}} \alpha_{k+i} \right) = \frac{1}{n} \sum_{i=-\frac{n-1}{2}}^{\frac{n-1}{2}} \left( \alpha_k - \frac{1}{n} \sum_{i=-\frac{n-1}{2}}^{\frac{n-1}{2}} \alpha_{k+i} \right)^2 \quad (6)$$

The self-covariance $C_k$ of the data streams in the same section as shown in Equation (6) is a self-covariance between the data stream in the first section from an arbitrary sensor and the data stream in the first section from the sensor. The section length of the first section is n. Since in the method using the self-covariance between the data streams in the same section, it is only necessary to acquire the data streams in one section, the amount of data required for processing can be reduced as compared with a method of obtaining a self-covariance of acquiring the data streams in different sections, which is advantageous. As described above, the data stream to be subjected to a self-covariance may be a data stream of acceleration or a data stream of a velocity, displacement, or the like.

In addition, as described with reference to FIG. 8, in the embodiment, the square envelope of the amplitude waveform may be obtained as the self-covariance. For example, the self-covariance $C_k$ of the data streams in the same section of Equation (6) can be represented as the following Equation (7).

$$C_k = \langle (\alpha_k - \langle \alpha_{k,n} \rangle)(\alpha_k - \langle \alpha_{k,n} \rangle) \rangle = \langle (\alpha_k - \langle \alpha_{k,n} \rangle)^2 \rangle \quad (7)$$

The $\alpha_k - \langle \alpha_{k,n} \rangle$ in parentheses of the square term of Equation (7) is obtained by subtracting the average value of the sections from $\alpha_k$ which is the expected value, as shown in the following Equation (8), for example, it can be considered to indicate the amplitude obtained by removing the offset by the high-pass filter processing of the moving average.

$$\alpha_k - \langle \alpha_{k,n} \rangle = \text{HPF}(\alpha_{k,n}) \tag{8}$$

In Equation (8), HPF ($\alpha_{k,n}$) indicates high-pass filter processing based on the moving average of sections of section length n. The square of the amplitude subjected to the high-pass filter processing can be represented as the following Equation (9).

$$(\alpha_k - \langle \alpha_{k,n} \rangle)^2 = \{\text{HBF}(\alpha_{k,n})\}^2 \tag{9}$$

The square is equivalent to a square of an absolute value. As a result, the self-covariance of the data streams in the same section shown in Equation (7) can be considered as a smooth waveform by low-pass filter processing of a moving average of square (square of absolute values), with regard to the waveform of the impact acceleration subjected to the high-pass filter processing as shown in the following Equations (10) and (11).

$$C_k = \langle (\alpha_k - \langle \alpha_{k,n} \rangle)^2 \rangle = \langle |\text{HPF}(\alpha_{k,n})|^2 \rangle \tag{10}$$

$$C_k = \text{LPF}\{|\text{HPF}(\alpha_{k,n})|^2\} \tag{11}$$

Generally, the envelope is obtained by removing a high frequency bandwidth signal by using the low-pass filter with respect to an absolute value of a waveform from which an offset is removed. Therefore, the self-covariance of the data streams in the same section of Equation (7) can be considered as the square envelope of the amplitude waveform of the impact. Thus, the self-covariance of the data streams in the same section can be considered as an emphasis filter of a waveform shape by the square envelope of the amplitude waveform. That is, the improvement of the statistical S/N ratio of the impact response waveform by the axle can be considered as the effect of emphasizing of the waveform shape.

As described above, in the embodiment, the processing unit 50 obtains the square envelope of the amplitude waveform of the impact as the self-covariance. Specifically, the square envelope of the amplitude waveform is obtained as the self-covariance of the data streams in the same section. More specifically, the processing unit 50 performs high-pass filter processing to the data stream as shown in Equation (8). Next, a value obtained by squaring the data stream subjected to the high-pass filter processing is obtained as shown in Equation (9). As shown in Equations (10) and (11), the low-pass filter processing is performed to a value obtained by squaring the data stream subjected to the high-pass filter processing to obtain the self-covariance. In this way, the square envelope of the amplitude waveform can be obtained as the self-covariance by simple processing using the high-pass filter processing and the low-pass filter processing. When obtaining the square envelope of the amplitude waveform as the self-covariance of the data streams in the same section, the section in which the high-pass filter processing is performed and the section in which the low-pass filter processing is performed are made to satisfy boundary conditions.

When the waveform shape is emphasized to the square of a general envelope, the section in which the high-pass filter processing is performed and the section in which the low-pass filter processing is performed may be different.

In the emphasis processing such as a covariance, a self-covariance, a self-covariance in the same section, and square envelope, the impact occurrence time as the impact occurrence timing does not match the peak time as the peak timing of the emphasized waveform. Therefore, in the embodiment, the processing unit 50 adjusts the offset of the section for obtaining the covariance so that the peak timing of the emphasized waveform by the covariance matches the impact occurrence timing. For example, the offset is provided in the calculation section of the emphasis processing so that the peak time of the emphasized waveform matches the impact occurrence time.

Figure 11:
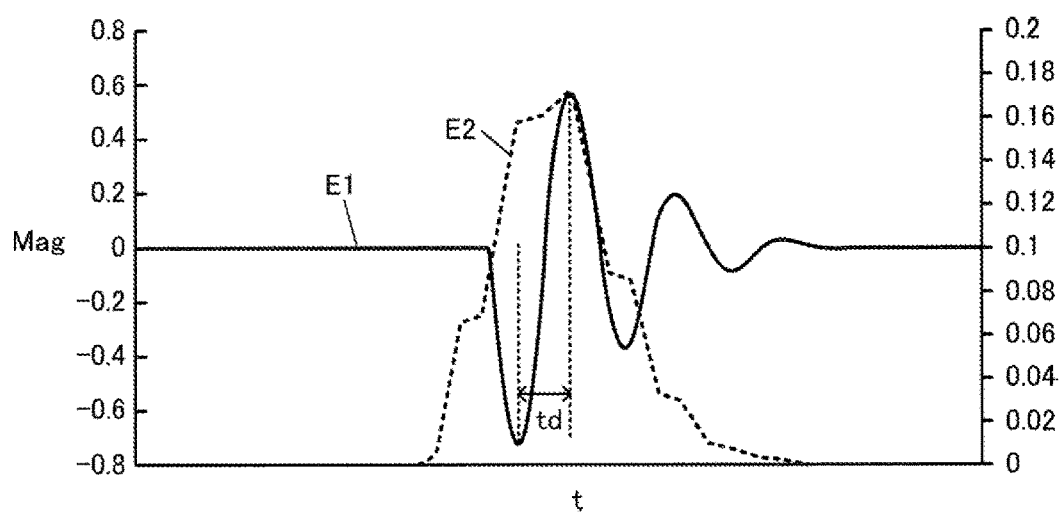
FIG. 11 is a diagram illustrating a phase difference between an impact waveform and an emphasized waveform.

FIG. 11 is a diagram illustrating a phase difference between an impact waveform and an emphasized waveform. E1 is the impact waveform and E2 is the emphasized waveform. The impact waveform of E1 in FIG. 11 is an approximate model waveform of the impact waveform in FIG. 31 described later, and the emphasized waveform of E2 is an approximate model waveform of a self-covariance waveform in FIG. 22 described later. When assuming that a first amplitude peak of an impact waveform of E1 is an impact occurrence time, and a peak of an emphasized waveform of E2 is an impact detection time, a time difference td is generated between the impact occurrence time and the impact detection time. In order to correct this, the method of taking the data sections of Equations (3), (4), (5) and (6) is adjusted.

Specifically, by setting the section length for adding an average to n+1, a negative section length and a positive section length are adjusted to different lengths for i=0 or l=0. In order to adjust the phase of the waveform, a time offset j is added to sections i and l in a self-covariance in the same section as shown in the following Equation (12).

$$C_k = \frac{1}{n} \sum_{i=-\frac{n-1}{2}+j}^{\frac{n-1}{2}+j} \left( \alpha_{k+l} - \frac{1}{n} \sum_{i=-\frac{n-1}{2}+j}^{\frac{n-1}{2}+j} \alpha_{k+i} \right)^2 \tag{12}$$

The range of the offset j is as shown in the following Equation (13).

$$-\frac{n-1}{2} \le j \le \frac{n-1}{2} \tag{13}$$

Figure 12:
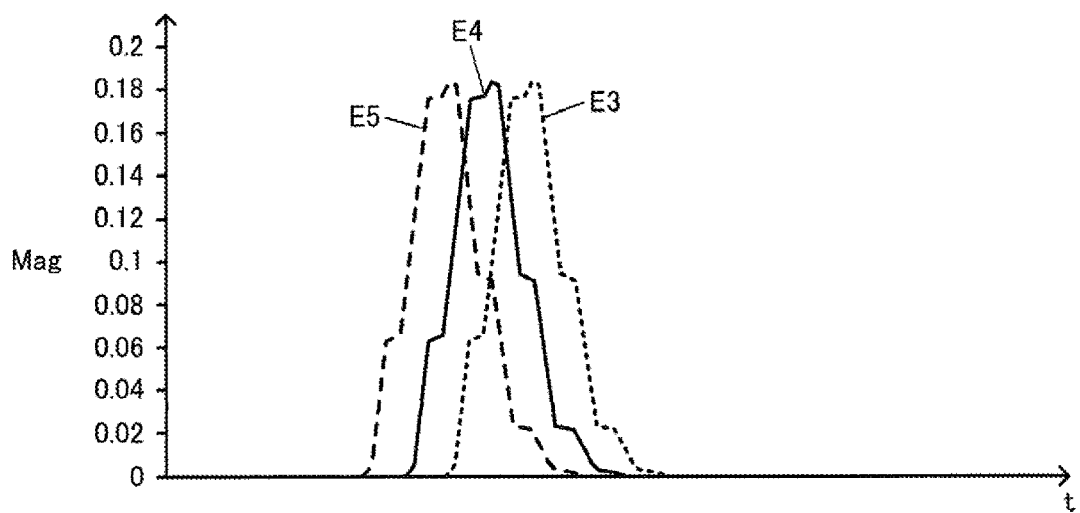
FIG. 12 is a diagram illustrating a phase adjustment by an offset.

The same offset adjustment can be performed even in an emphasis processing method other than the self-covariance in the same section. E3, E4 and E5 in FIG. 12 indicate a state where the phase of the emphasized waveform is adjusted by the offset j. That is, when the offset j is defined as j=(n−1)/2, j=0, and j=−(n−1)/2, a time phase of the emphasized waveform is changed.

Figure 19:
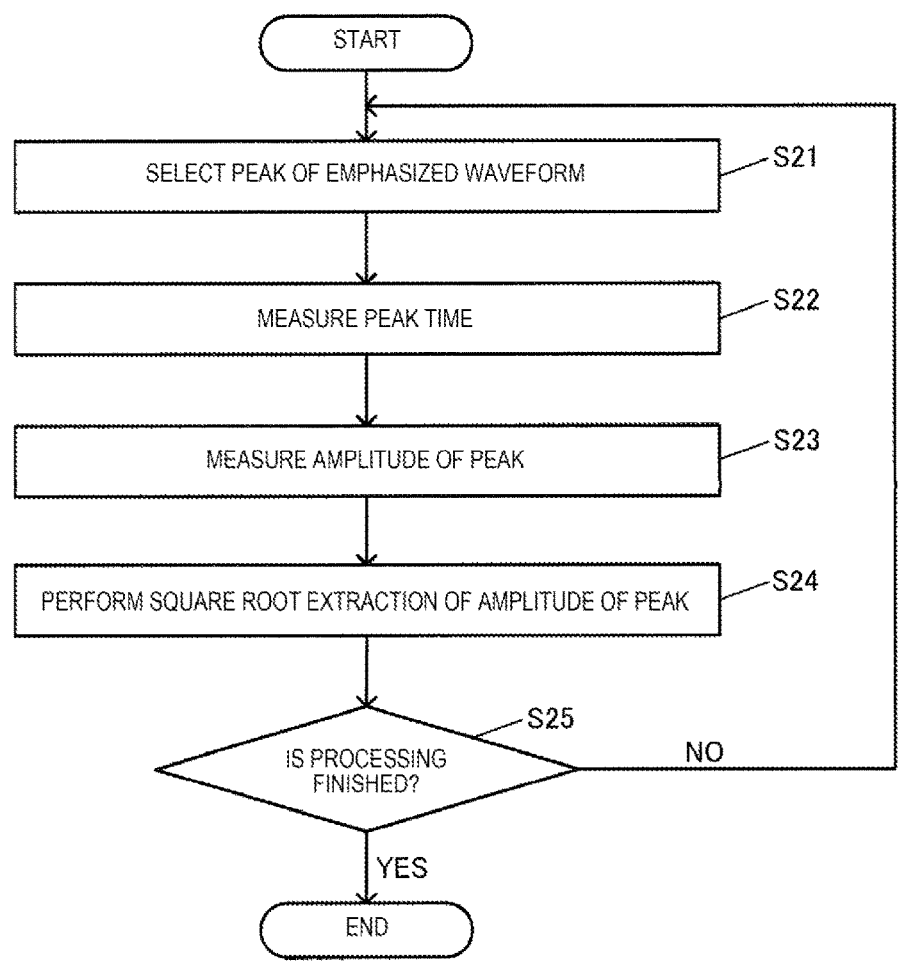
FIG. 19 is a flowchart for explaining a peak time and intensity determination processing in a self-covariance in the same section and a square envelope of an amplitude waveform.

By adjusting the offset j, the peak time of the emphasized waveform can be matched with the impact occurrence time of the first amplitude peak of the impact waveform. Namely, adjustment for making the time difference td in FIG. 11 zero is possible, thereby improving measurement accuracy. Further, by being once adjusted, the measurement process described in FIG. 3, FIG. 13 and FIG. 19 is not required to be adjusted for each time, and the measurement accuracy of the impact occurrence time can be improved.

The section length for adding the average may be an even number. If the section length is an even number, although the negative section length and the positive section length are different from each other for i=0 or l=0, the time phase of the emphasized waveform can be adjusted by adding the time offset j.

In the embodiment, the processing unit 50 performs calculation processing for obtaining the intensity of the impact at the timing of the impact to the structure based on the covariance. By obtaining the intensity of the impact in this way, the obtained intensity can be utilized for various processing. The calculation processing of the intensity will be explained referring to FIGS. 13 to 19.

Figure 13:
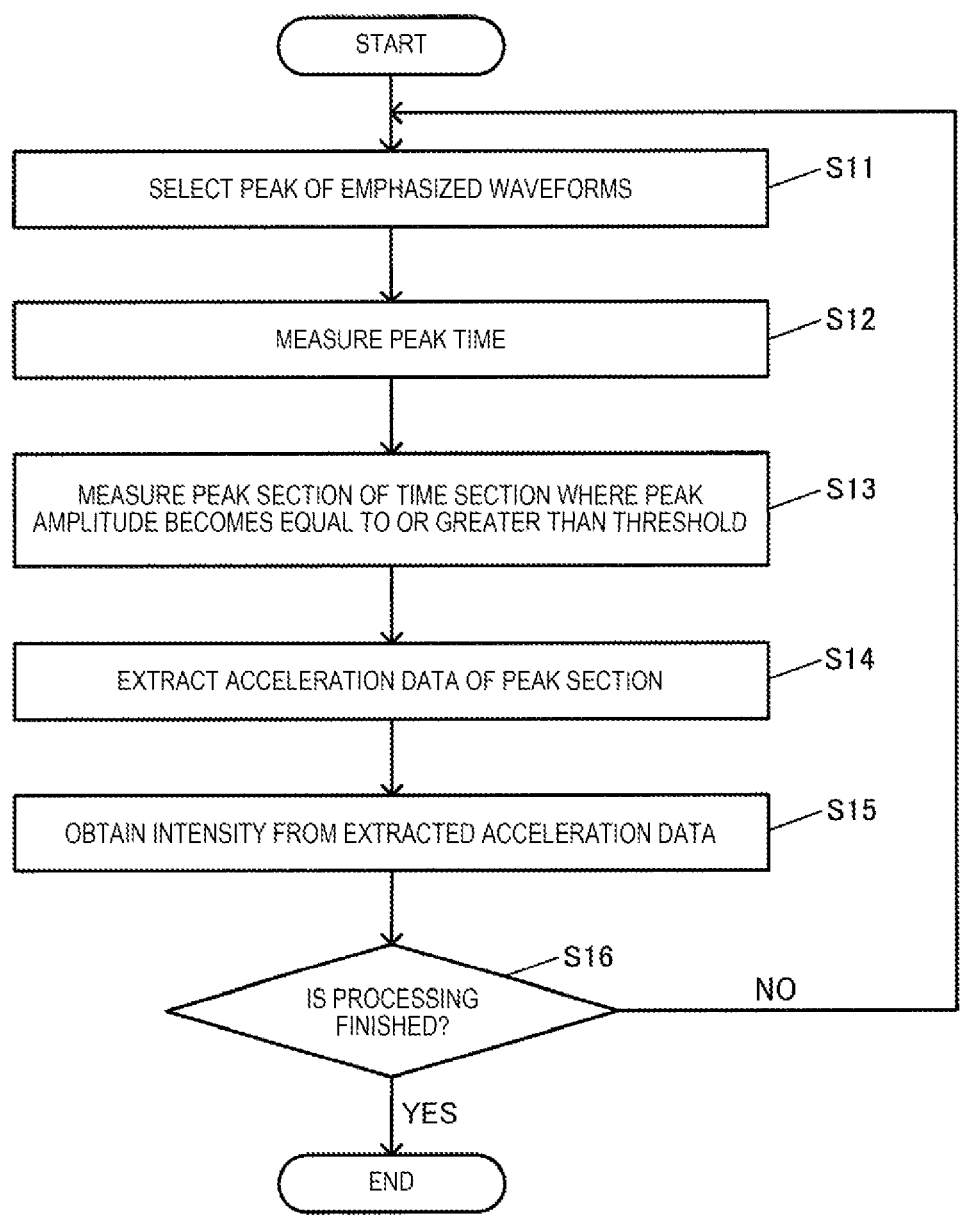
FIG. 13 is a flowchart for explaining a peak time and intensity determination processing in a covariance and a self-covariance.
Figure 14:
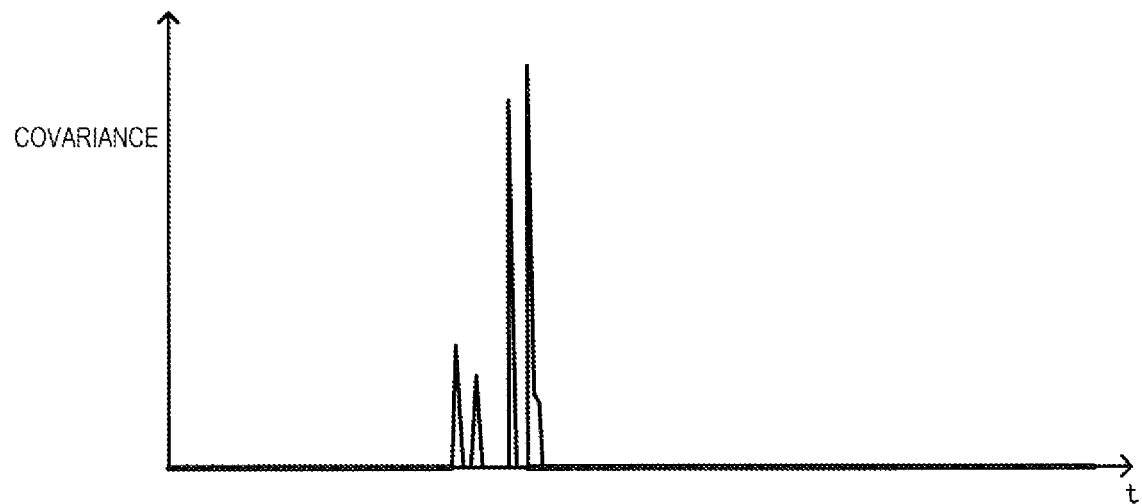
FIG. 14 is a diagram illustrating an emphasized waveform obtained by emphasis processing of impact acceleration.
Figure 15:
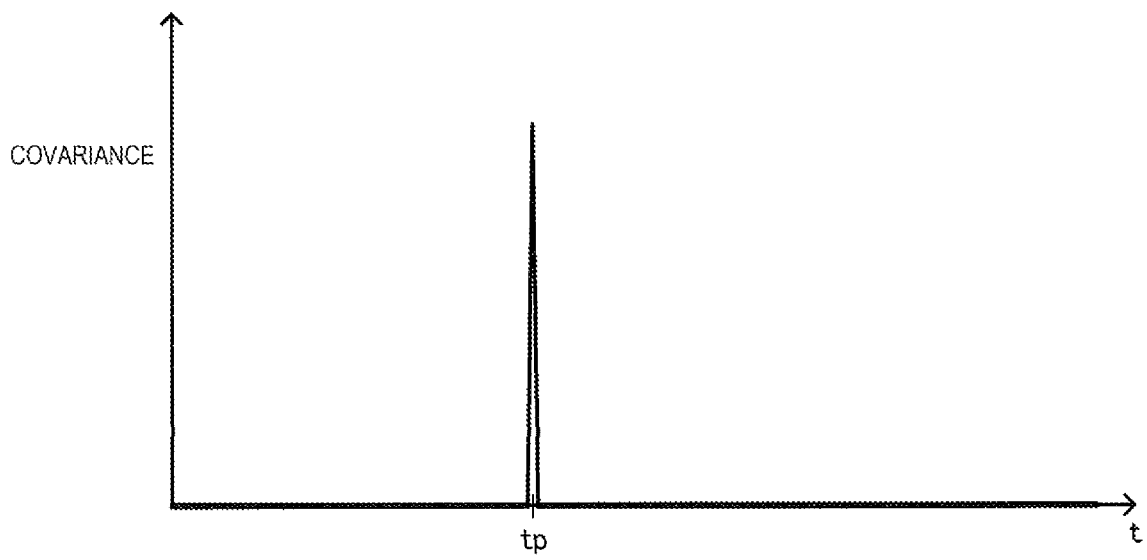
FIG. 15 is a diagram illustrating a waveform of a selected peak.
Figure 16:
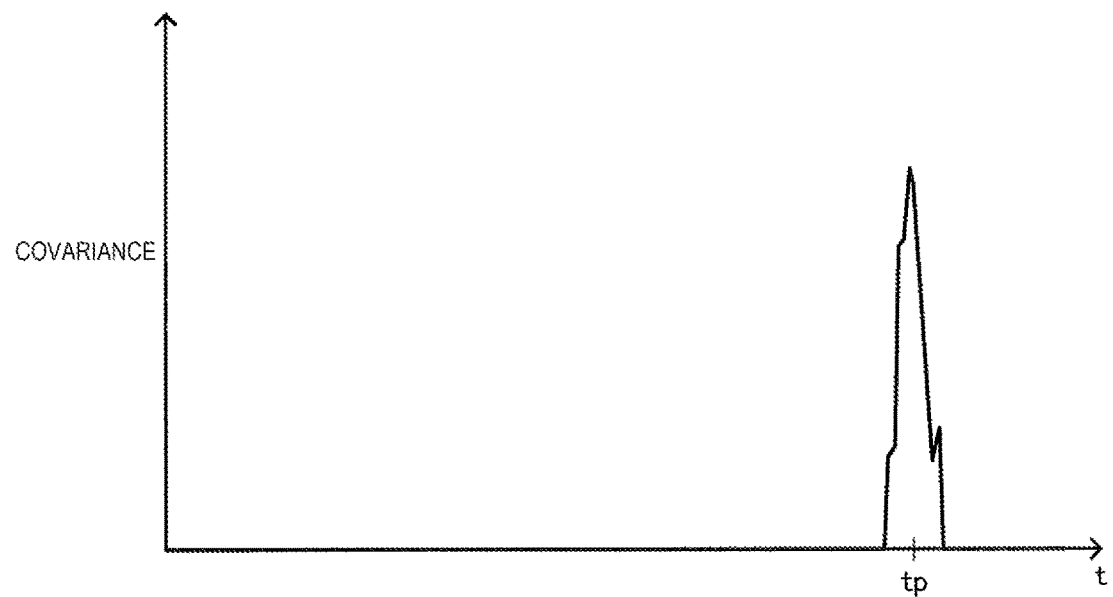
FIG. 16 is an enlarged diagram of a waveform of a peak.
Figure 17:
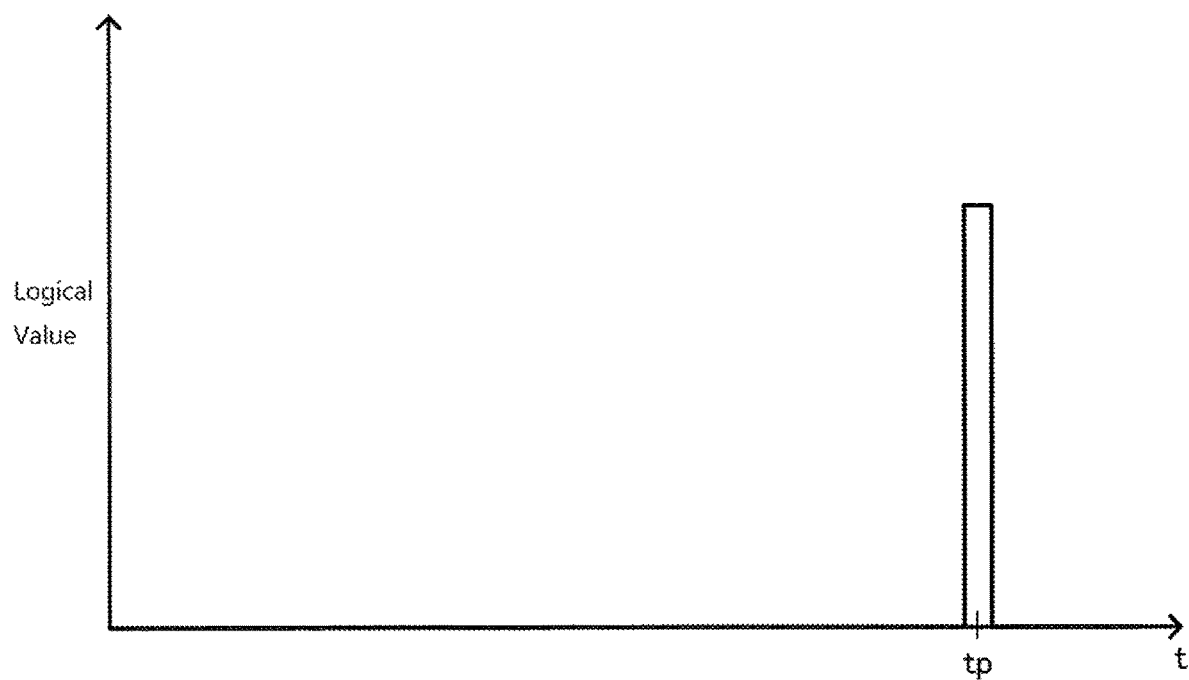
FIG. 17 is an explanatory diagram for explaining a generation of a mask corresponding to a peak section.

FIG. 13 is a flowchart for explaining a peak time and intensity determination processing in a covariance and a self-covariance. The processing unit 50 performs emphasis processing by using a covariance and a self-covariance to the waveform of the impact acceleration described in FIGS. 4 and 5, thereby obtaining an emphasized waveform in which the peak of the impact acceleration is emphasized as illustrated in FIG. 14. As illustrated in FIG. 15, the processing unit 50 selects a peak to be processed among the emphasized waveforms in FIG. 14 (Step S11). Then, the peak time tp is measured (Step S12). That is, the time tp which is the peak occurrence time is measured. Next, a peak section of a time section where the peak amplitude becomes equal to or greater than a threshold is measured, and acceleration data of the peak section is extracted (Steps S13 and S14). For example, FIG. 16 is an enlarged diagram of the waveform of the peak selected as illustrated in FIG. 15. Then, as illustrated in FIG. 17, a mask corresponding to the peak section where the amplitude of the peak becomes equal to or greater than the threshold is generated, and acceleration data of the peak section is extracted by using the generated mask. Then, the intensity is obtained from the extracted acceleration data (Step S15). For example, the intensity corresponding to the amplitude of the peak of the waveform of the impact acceleration is obtained. Whether the processing is finished is determined (Step S16), and when the processing is not finished, the processing returns to the step S11 to select a peak to be a next processing target. When the processing for all the peaks is finished, the determination processing is finished.

Figure 18:
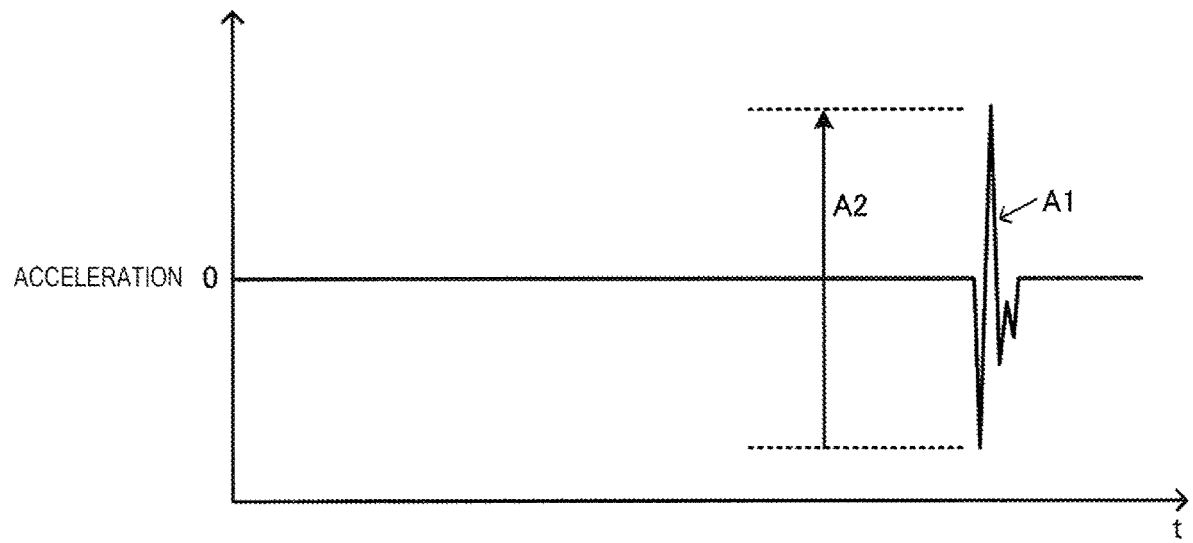
FIG. 18 is an explanatory diagram for explaining extraction of a waveform of acceleration data.

FIG. 18 is an enlarged diagram of the waveform of the acceleration data extracted in step S14 of FIG. 13. For example, the waveform of acceleration data as illustrated in A1 of FIG. 18 is extracted from the waveform of the impact acceleration in FIG. 5 by using the mask in FIG. 17. The waveform of the acceleration data is an impact waveform. Then, for example, the amplitude of the waveform as illustrated in A2 is obtained as the intensity of the impact. The measurement of the intensity is not limited to such measurement of the amplitude. For example, the intensity may be obtained by integrating the half wavelength of the waveform or integrating the absolute value of one waveform.

FIG. 19 is a flowchart for explaining the peak time and intensity determination processing in the self-covariance in the same section and a square envelope of the amplitude waveform. As in FIG. 13, the processing unit 50 selects the peak of the emphasized waveform and measures the peak time (Steps S21 and S22). Then, the amplitude of the peak is measured, and the square root extraction is performed on the measured amplitude of the peak (Steps S23 and S24). That is, the peak of the self-covariance or the square envelope of the amplitude waveform is measured, and the root of the measured peak is obtained thereby obtaining the intensity. Whether the processing is finished is determined (Step S25), and when the processing is not finished, the processing returns to the step S21 to select a peak to be a next processing target. When the processing for all the peaks is finished, the determination processing is finished.

In the method for obtaining a covariance or a self-covariance in different sections as illustrated in FIG. 13, extraction processing of extracting from the waveform of the impact acceleration using a mask is required. On the other hand, in the method for obtaining a self-covariance in the same section or a square envelope of the amplitude waveform as illustrated in FIG. 19, the intensity can be obtained by measuring the amplitude of the peak and obtaining the root thereof. Thus, it is possible to simplify the processing and reduce the processing load.

3. Bandpass Filter Processing

In the embodiment, the processing unit 50 performs bandpass filter processing to the data stream from the sensor, and obtains a covariance from the data stream subjected to the bandpass filter processing. The bandpass filter processing will be explained in detail.

Figure 20:
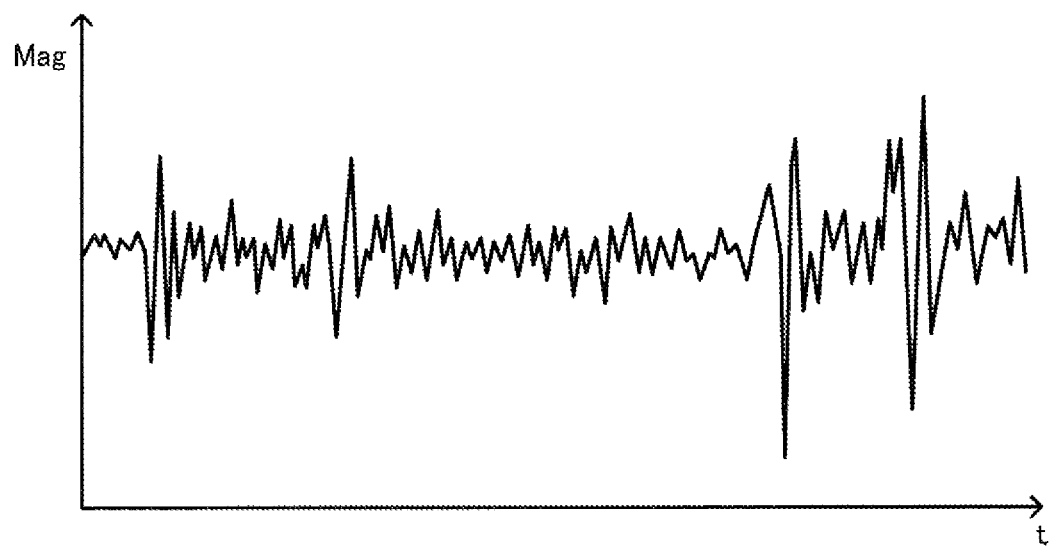
FIG. 20 is a diagram illustrating an example of a waveform of impact acceleration.
Figure 21:
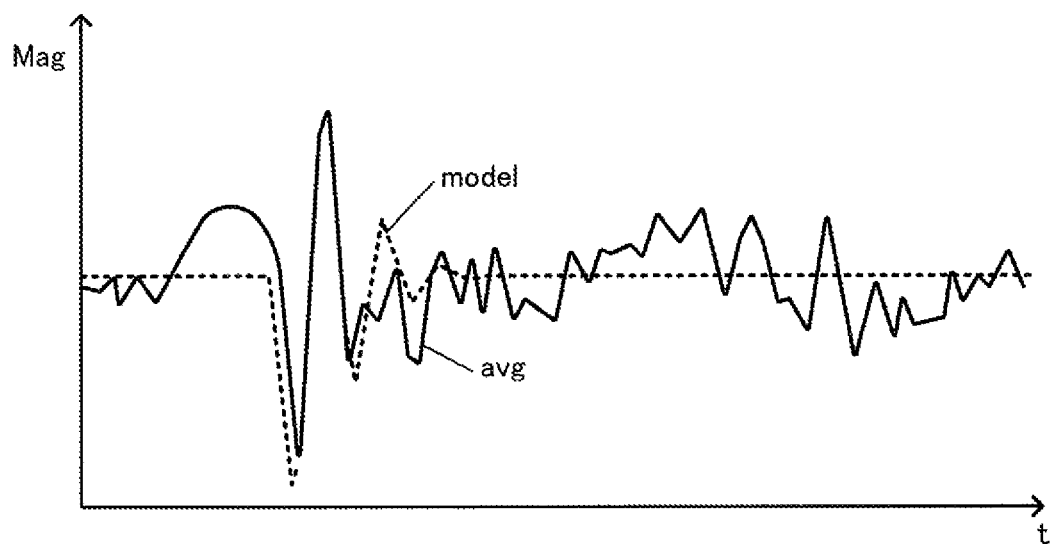
FIG. 21 is a comparison diagram of an average impact waveform and a waveform of an approximate model.
Figure 22:
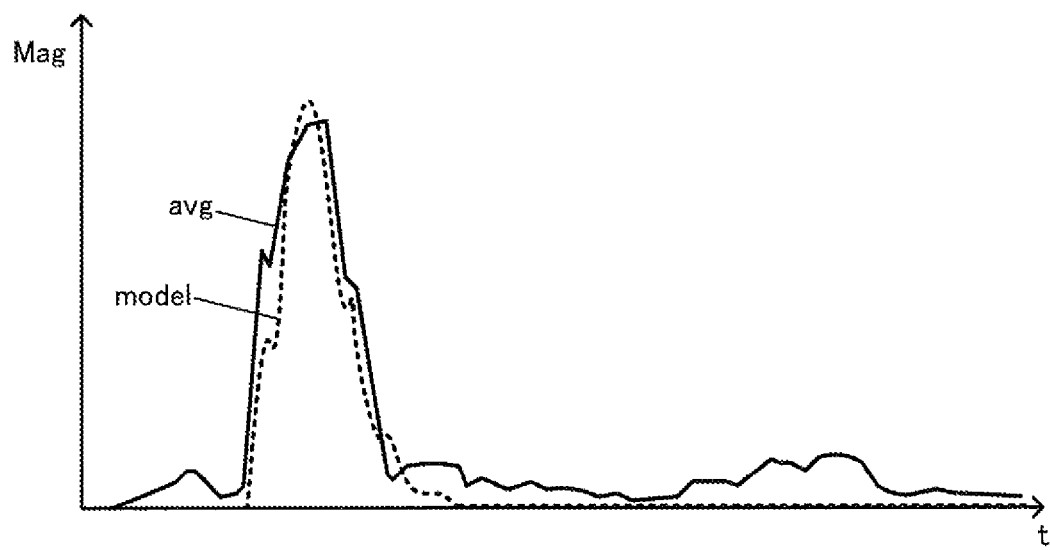
FIG. 22 is a comparison diagram of a self-covariance of an average impact waveform and a self-covariance of a waveform of an approximate model.

FIG. 20 is a diagram illustrating an example of the observed impact waveform. In FIG. 21, an average impact waveform (avg) of a plurality of observed impact waveforms and a waveform of an approximate model (model) approximating the average impact waveform are illustrated. That is, the waveform of the approximate model approximating the average impact waveform is created from the average impact waveform. In FIG. 22, a self-covariance of the average impact waveform and a self-covariance of the waveform of the approximate model are illustrated. The self-covariance is the self-covariance of the data streams in the same section. The approximate model is a model for approximately representing the observed impact waveform.

Figure 23:
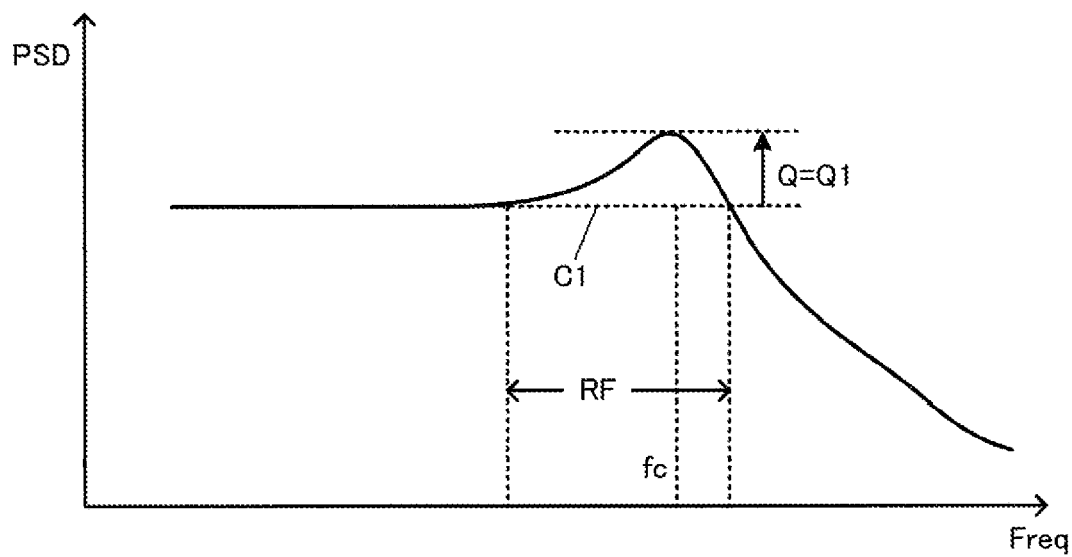
FIG. 23 is a diagram illustrating a power spectrum of an approximate model.

FIG. 23 is a power spectrum representing frequency characteristics of the approximate model obtained by performing FFT to the approximate model. As illustrated in FIG. 23, the approximate model of the impact waveform has response frequency characteristics of a mechanical filter in which a Q value is Q=Q1 and a cutoff frequency is fc. For example, Q1 is about 4 and fc is about 80 MHz. The response frequency characteristics of the impact given to the structure by the movement of the moving object have the response frequency characteristics of the mechanical filter as illustrated in FIG. 23. For example, the impact waveform illustrated in A1 of FIG. 18 is considered to be generated by the response frequency characteristics of the mechanical filter. Therefore, in order to observe such a response by the mechanical filter at a low S/N ratio, it is desirable to perform the bandpass filter processing for passing a frequency bandwidth where a gain of the mechanical filter exceeds 1. For example, since C1 in FIG. 23 corresponds to a boundary where the gain of the mechanical filter becomes 1, bandpass filter processing for passing a frequency bandwidth RF corresponding to the boundary of C1 may be performed. The frequency bandwidth RF is, for example, a range of about 40 Hz to 100 Hz. FIG. 24 is an example of the frequency characteristics of the bandpass filter.

In the embodiment, the bandpass filter processing is preferably processing for passing the frequency bandwidth RF in which the gain of the response frequency characteristics of the impact is larger than 1. By performing such bandpass filter processing, the impact waveform can be observed at a higher S/N ratio, and appropriate emphasis processing of the impact waveform can be realized.

4. Adjustment of Section Length

In the embodiment, the processing unit 50 obtains covariance in the section including one wavelength of the impact waveform. For example, the processing unit 50 obtains a self-covariance in the same section set in the section lengths of one or more wavelength of the impact waveform. For example, when obtaining the self-covariance of the data streams in the same section of Equations (6) and (7), the section length of the section for obtaining the self-covariance is set to a length of equal to or more than one wavelength of the impact waveform. More preferably, the processing unit 50 obtains a covariance in a section having a section length shorter than two wavelengths of the impact waveform. For example, the processing unit 50 obtains the self-covariance of the data streams in the same section set to have a section length shorter than two wavelengths of the impact waveform. For example, when obtaining the self-covariance of the data streams in the same section of Equations (6) and (7), the section length of the section for obtaining the self-covariance is set to a length which is equal to or more than one wavelength and shorter than two wavelengths of the impact waveform.

Figure 25:
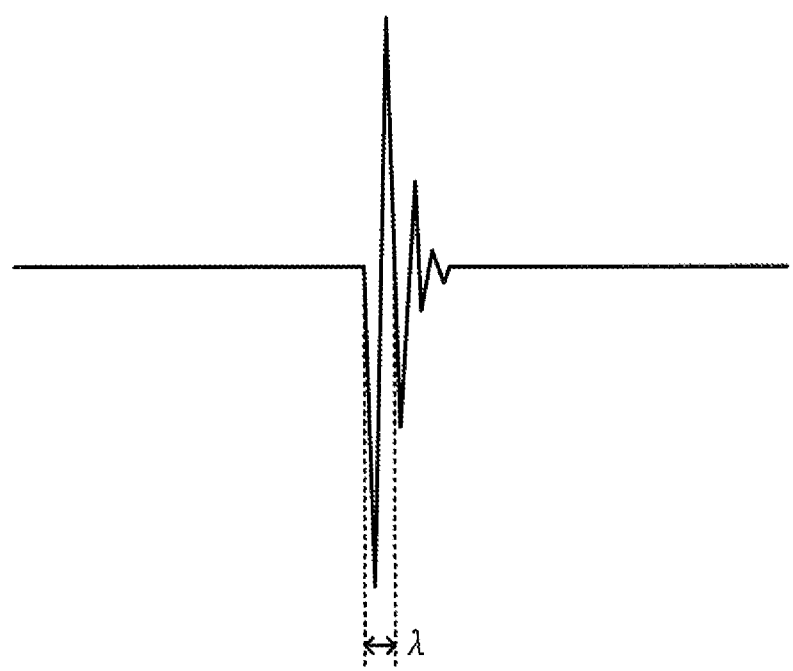
FIG. 25 is a diagram illustrating an example of an impact waveform.

An example of the impact waveform is illustrated in FIG. 25. The impact waveform is a waveform of impact generated in the structure due to the movement of the moving object. That is, the impact waveform is generated by the response frequency characteristics of the mechanical filter of the structure described in FIG. 23. For example, by the collision of the axle of the moving object, the structure performs frequency response of the mechanical filter as illustrated in FIG. 23. For example, resonance corresponding to $Q=Q1$, being the Q value in FIG. 23 is generated by the collision of the axle, and vibration by the resonance appears as the impact waveform as illustrated in FIG. 25. That is, the impact waveform in FIG. 25 is a vibration waveform having a vibration frequency of the resonance. In FIG. 25, $\lambda$ corresponds to one wavelength of the impact waveform. Then, $1/\lambda$ corresponds to the vibration frequency of the impact waveform. In the embodiment, the section length of the section when obtaining a covariance is set to be $\lambda$ or more. That is, the covariance is obtained in the section length equal to or longer than the period of the vibration frequency of the impact waveform. Further, the section length of the section when obtaining the covariance is set to be shorter than $2 \times \lambda$.

Figure 26:
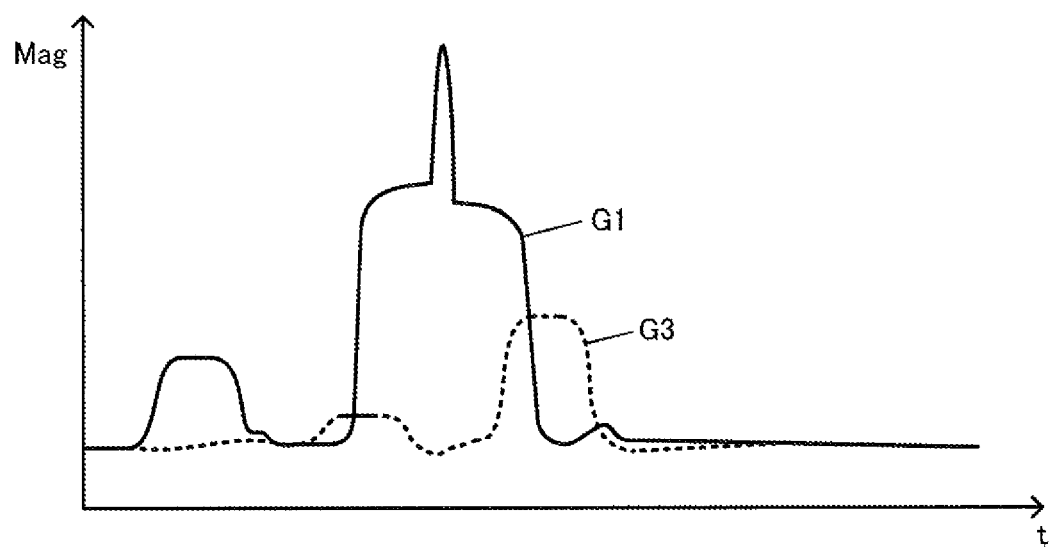
FIG. 26 is a diagram illustrating a waveform of a self-covariance when a section length is long.

FIG. 26 is an example of a waveform of the self-covariance in lines G1 and G3 when the section length is long. For example, it is an example of the waveform of the self-covariance when the section length is two wavelengths or more and $2 \times \lambda$ or more. The self-covariance of the line G1 is the self-covariance of the same section to the data stream from the sensor 1, and the self-covariance of the line G3 is the self-covariance of the same section with respect to the data stream from the sensor 3. If the section length is too long, the waveform becomes broader and it becomes difficult to specify the timing of occurrence of the impact.

Figure 27:
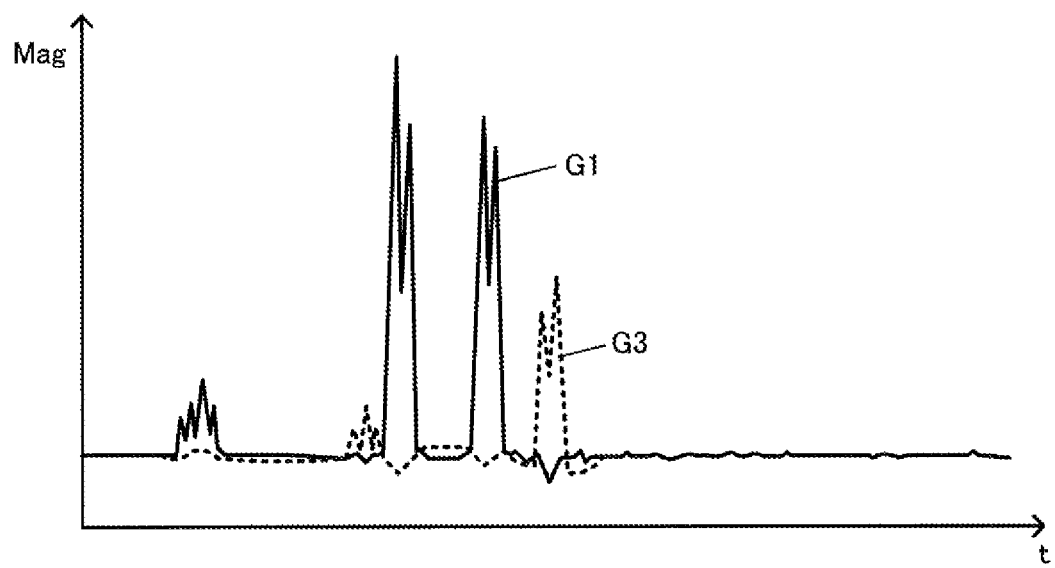
FIG. 27 is a diagram illustrating a waveform of a self-covariance when a section length is short.

FIG. 27 is an example of a waveform of the self-covariance in lines G1 and G3 when the section length is short. For example, it is an example of the waveform of the self-covariance when the section length is shorter than one wavelength and shorter than $\lambda$. If the section length is too short, the waveform becomes noisy and the peak is divided. That is, the peak which is originally one is divided into a plurality of peaks, and the emphasized waveform by the self-covariance becomes a double-peak waveform. Therefore, it becomes difficult to specify the occurrence timing of the impact.

Figure 28:
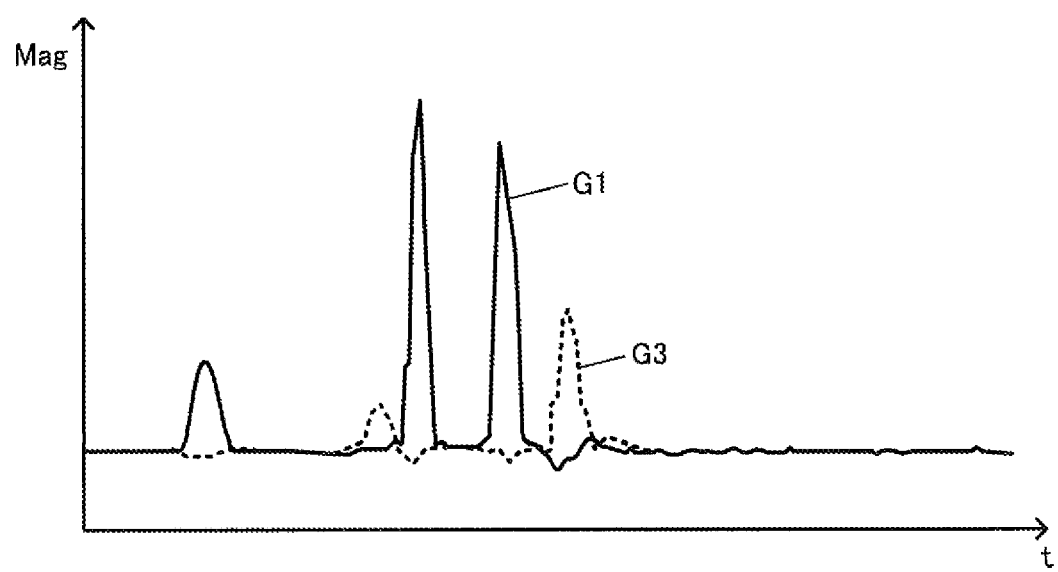
FIG. 28 is a diagram illustrating a waveform of a self-covariance when a section length is appropriate.

FIG. 28 is a diagram illustrating an example of the waveform of the self-covariance in the lines G1 and G3 when the section length is appropriate. For example, it is an example of the waveform of the self-covariance when the section length is one wavelength or more and is shorter than two wavelengths. For example, it is an example of the waveform of the self-covariance when the section length is $\lambda$ or more and is shorter than $2 \times \lambda$. By setting the section length to an appropriate length, since the peak waveform as the emphasized waveform does not become a double-peak waveform and becomes a single-peak waveform, the occurrence timing of the impact can be accurately and clearly specified. In FIG. 28, it is determined that the number of axles of the moving object passing the lane corresponding to the line G1 is three, and the number of axles of the moving object passing the lane corresponding to the line G3 is two, thereby realizing appropriate axle detection.

Figure 29:
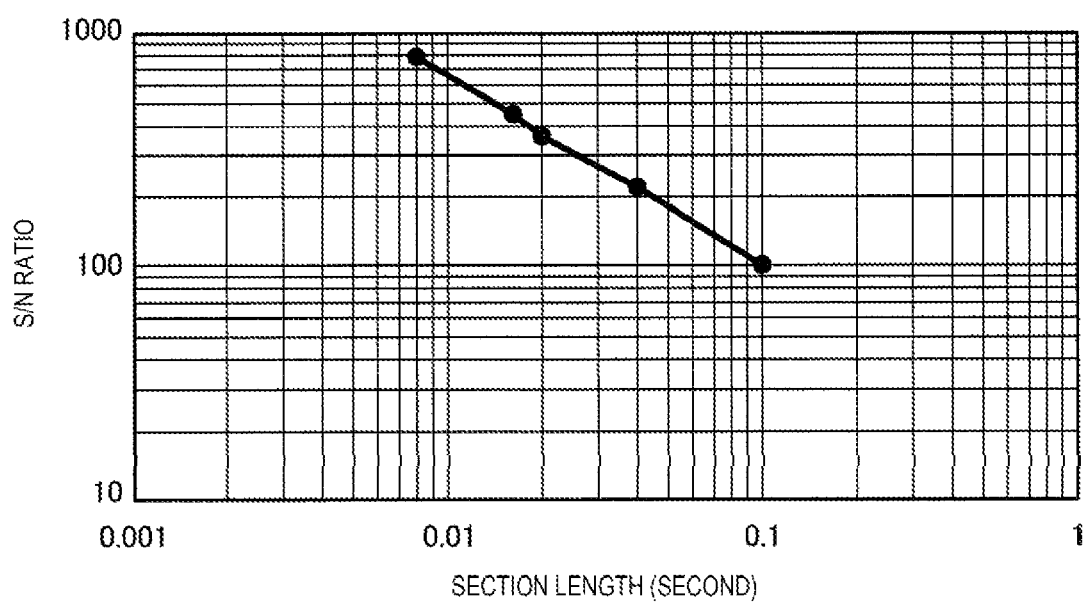
FIG. 29 is a diagram illustrating a relationship between a section length and an S/N ratio.

FIG. 29 is a diagram illustrating a relationship between the section length and the S/N ratio. For example, it is a diagram illustrating a correlation between the section length and a broad shape of the waveform of the self-covariance. As illustrated in FIG. 29, a broad tendency of the waveform becomes an inverse function of the section length. Therefore, it is desirable to select the smallest section length within a range where the waveform does not become a double-peak waveform.

5. Single-Peak Waveform

In the embodiment, the processing unit 50 obtains a covariance in a section of a section length in which an emphasized waveform by a covariance becomes a single-peak waveform. Specifically, the processing unit 50 obtains a square envelope of the amplitude waveform or a self-covariance of the same section in a section of a section length in which the emphasized waveform becomes a single-peak waveform.

As described in FIG. 25, in the embodiment, a covariance is obtained in a section having a section length equal to or longer than the period of the vibration frequency of the vibration waveform. Specifically, a square envelope of the amplitude waveform or a self-covariance of the same section is obtained in a section having a section length equal to or longer than the period of the vibration frequency. Thus, as illustrated in FIG. 28, a waveform of a covariance in which a peak waveform as an emphasized waveform becomes a single-peak waveform can be obtained.

Figure 30:
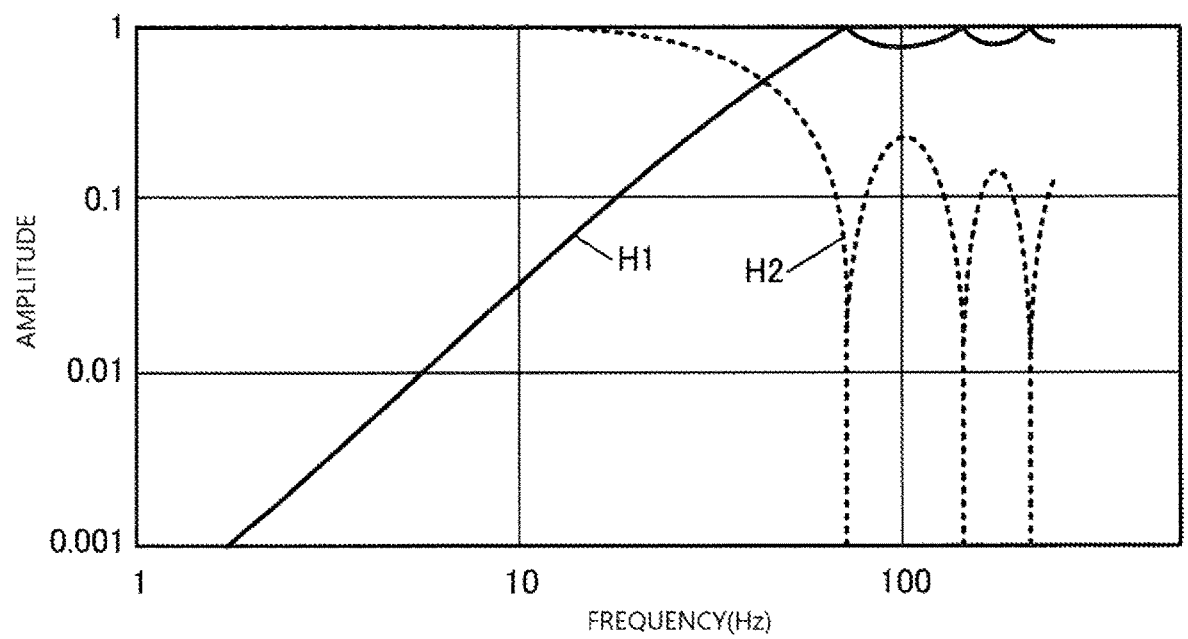
FIG. 30 is a diagram illustrating frequency characteristics of a high-pass filter and a low-pass filter.

In the square envelope of the amplitude waveform or the self-covariance of the same section, the impact waveform is band-limited by the high-pass filter characteristics shown in H1 and the low-pass filter characteristics shown in H2 as illustrated in FIG. 30. These filter characteristics are determined by the square envelope of the amplitude waveform or the section length of the self-covariance in the same section. Hereinafter, a change in frequency characteristics of the signal will be explained by taking a signal processing process of the square envelope of the amplitude waveform as an example.

Figure 31:
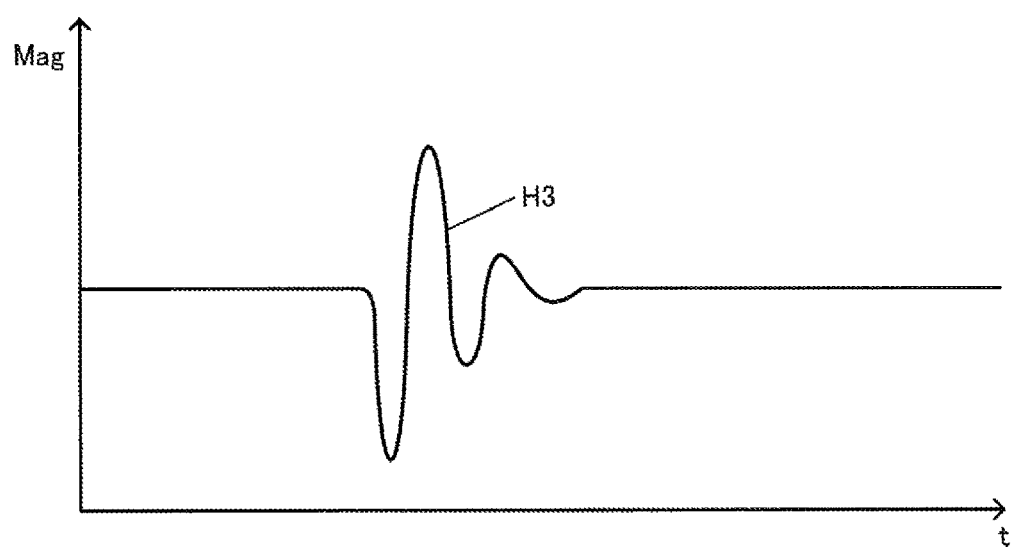
FIG. 31 is a diagram illustrating a waveform of an approximate model of an impact waveform.
Figure 32:
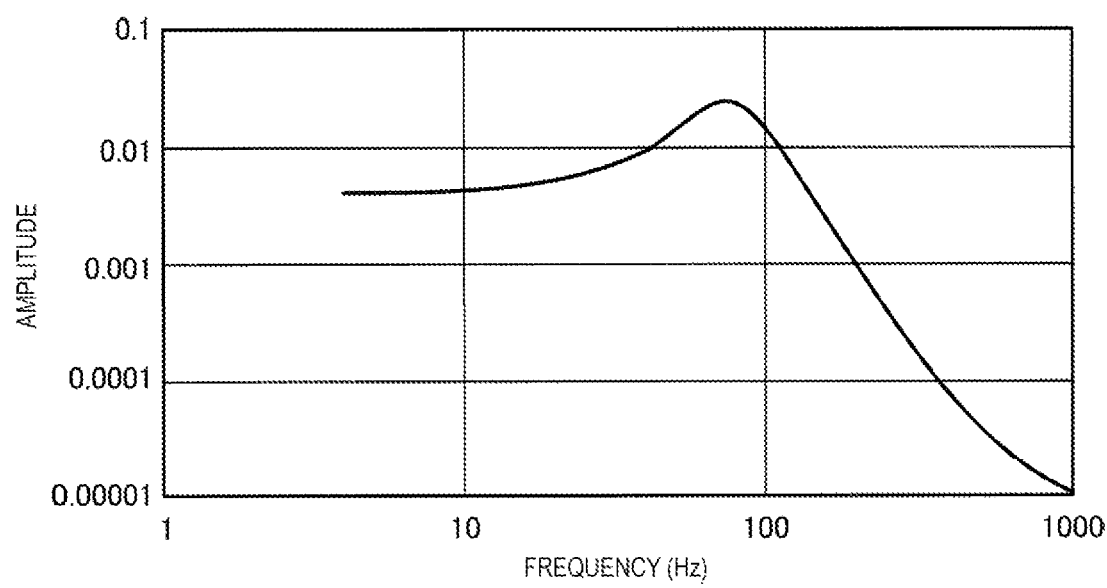
FIG. 32 is a diagram illustrating a power spectrum of a waveform of an approximate model.
Figure 33:
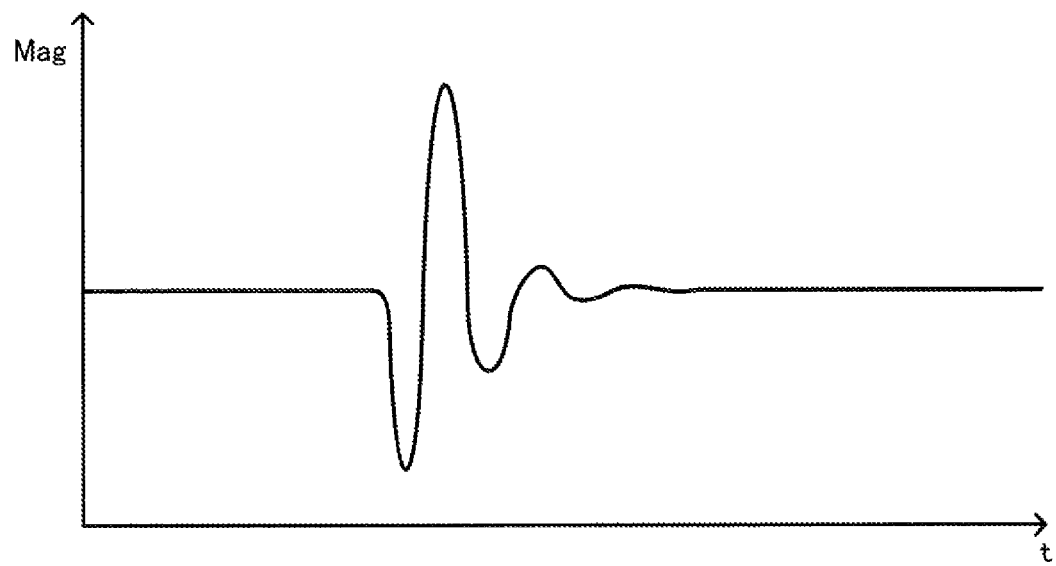
FIG. 33 is a diagram illustrating a waveform of an approximate model after high-pass filter processing.
Figure 34:
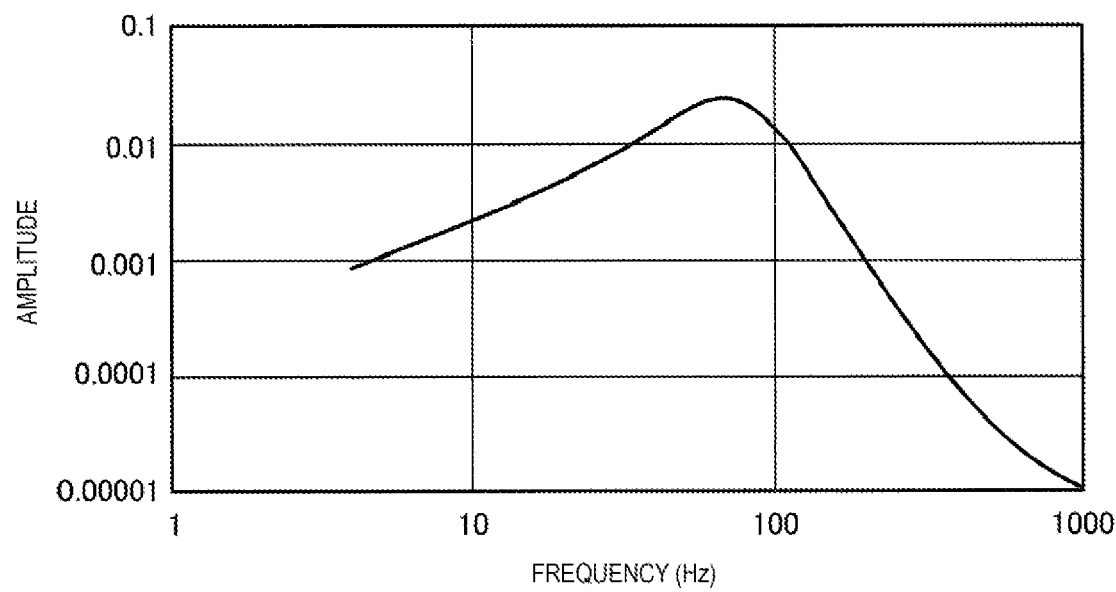
FIG. 34 is a diagram illustrating a power spectrum of a waveform of an approximate model after high-pass filter processing.

In FIG. 31, H3 is an approximate model for approximating an impact waveform. FIG. 32 is a diagram illustrating a power spectrum of a waveform of an approximate model. When high-pass filter processing of frequency characteristics shown in H1 of FIG. 30 is performed to the waveform of the approximate model, the waveform as shown in FIG. 33 is obtained. FIG. 34 is a diagram illustrating the power spectrum of the waveform of the approximate model subjected to the high-pass filter processing. The waveform of the approximate model subjected to the high-pass filter processing corresponds to Equation (8) described above used in the explanation of the square envelope of the amplitude waveform. That is, in Equation (8), high-pass filter processing of the frequency characteristics is performed as shown in H1 of FIG. 30.

Figure 35:
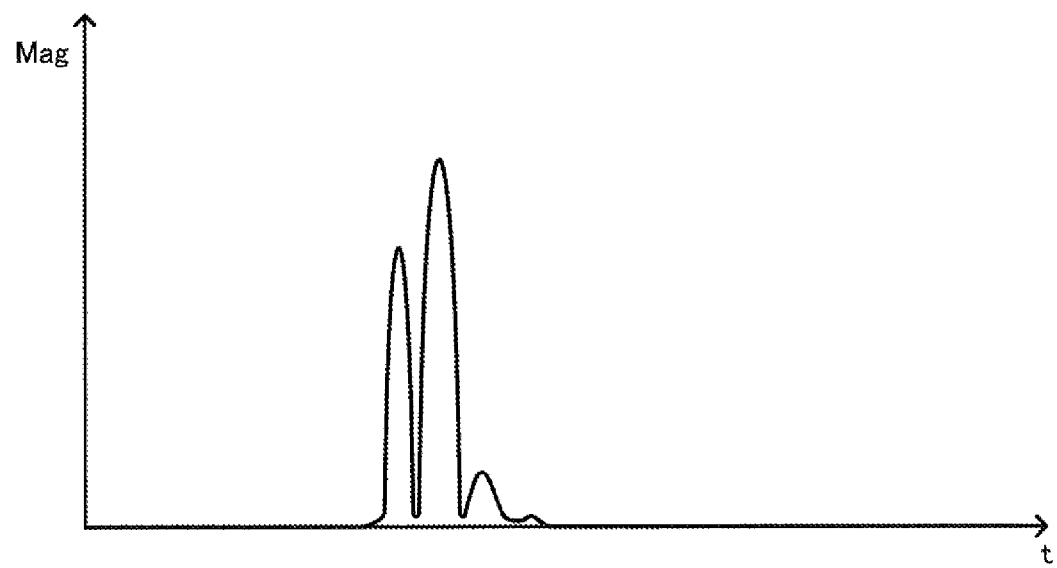
FIG. 35 is a diagram illustrating a waveform obtained by squaring an amplitude of a waveform of an approximate model after high-pass filter processing.
Figure 36:
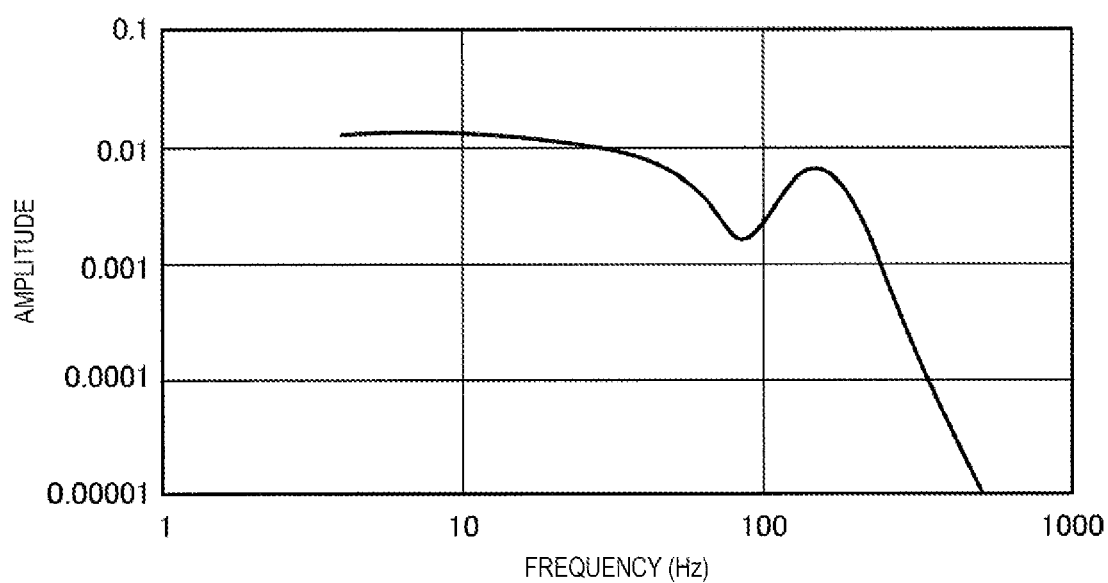
FIG. 36 is a diagram illustrating a power spectrum of a waveform of which amplitude is squared.

When the amplitude of the waveform of the approximate model subjected to the high-pass filter processing is squared, the waveform as illustrated in FIG. 35 is obtained. FIG. 36 is a diagram illustrating a power spectrum of the waveform in FIG. 35. By squaring the amplitude, an amplitude is generated in the low-frequency bandwidth, and the vibration frequency of the impact waveform is doubled. The waveform of the square of the amplitude in FIG. 35 corresponds to Equation (9) described above.

Figure 37:
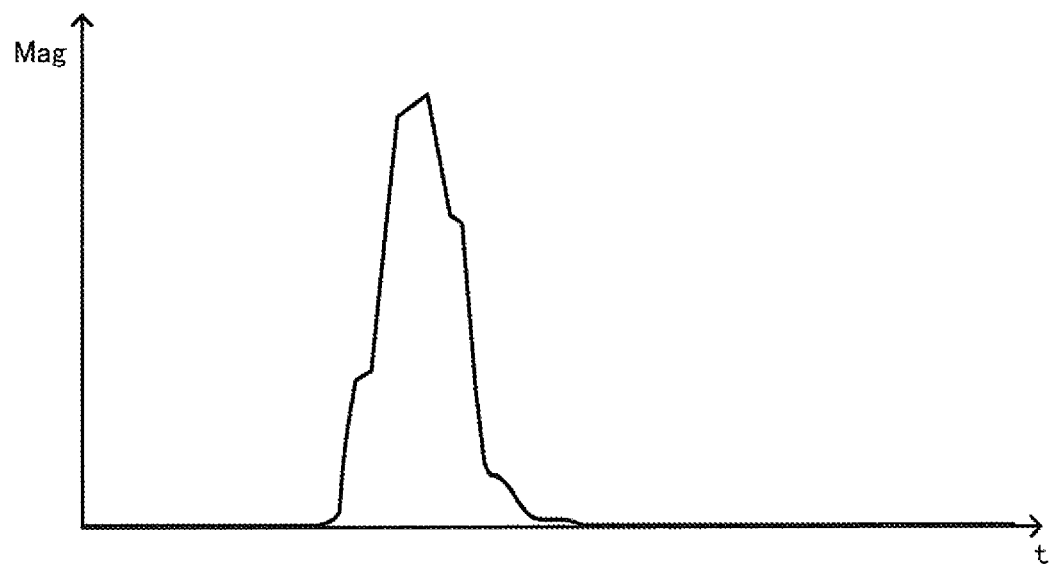
FIG. 37 is a diagram illustrating a waveform obtained by performing low-pass filter processing on a waveform of which amplitude is squared.
Figure 38:
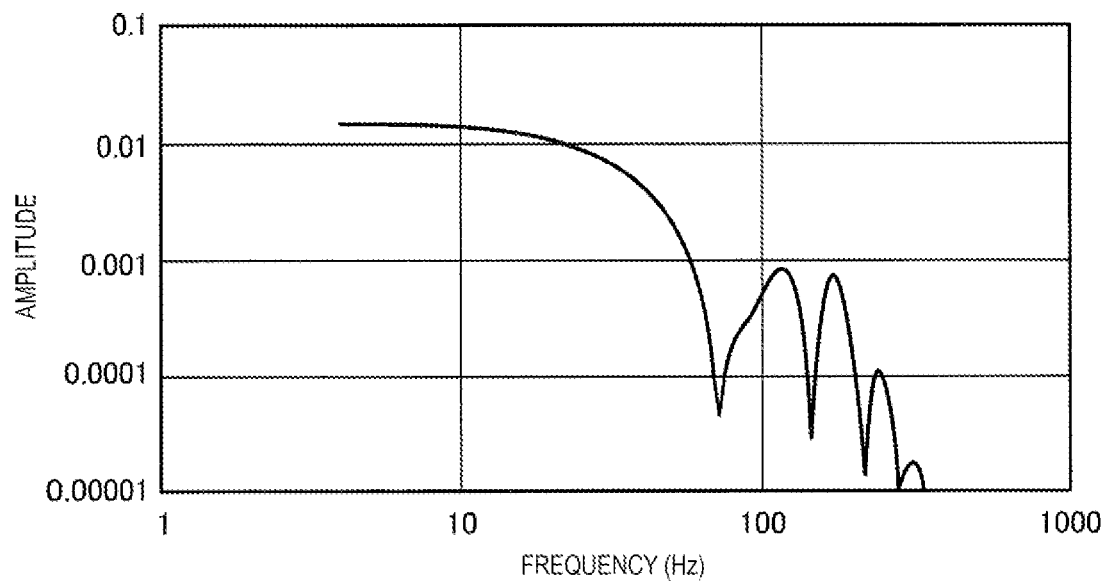
FIG. 38 is a diagram illustrating a power spectrum of a waveform after low-pass filter processing.

When the low-pass filter processing shown in H2 of FIG. 30 is performed to the waveform illustrated in FIG. 35 obtained by squaring the amplitude of the waveform of the approximate model, the waveform as shown in FIG. 37 is obtained. FIG. 38 is a diagram illustrating the power spectrum of the waveform in FIG. 37. The waveform in FIG. 37 corresponds to Equations (10) and (11) described above and corresponds to the square envelope of the amplitude waveform of the impact. That is, in Equation (11) described above, low-pass filter processing of the frequency characteristics as shown in H2 of FIG. 30 is performed.

Figure 39:
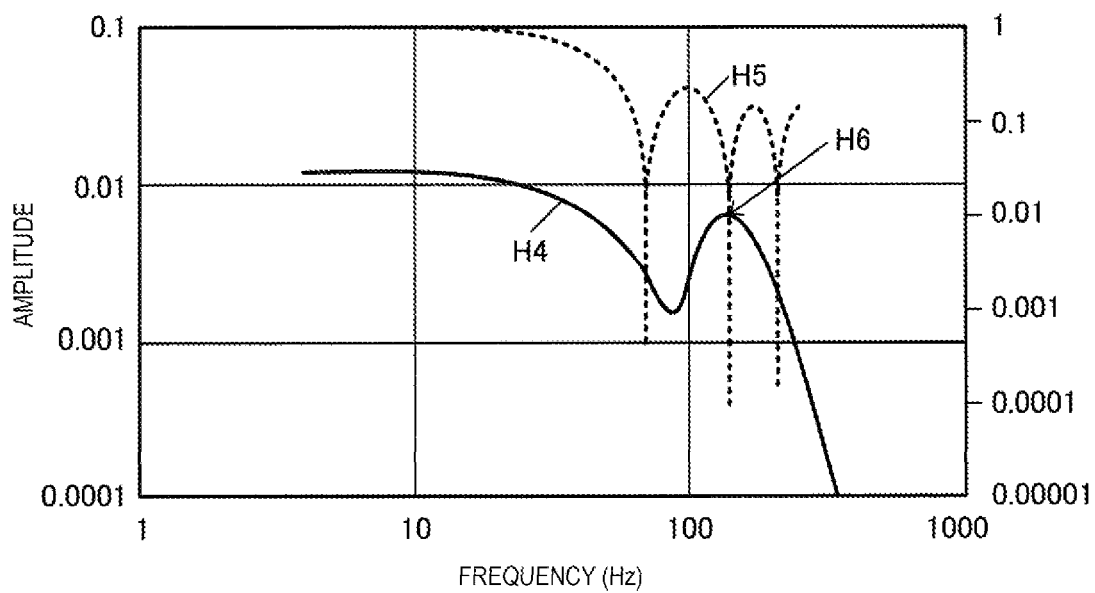
FIG. 39 is a diagram illustrating frequency characteristics of a waveform of which amplitude is squared and frequency characteristics of a low-pass filter.

H4 of FIG. 39 is gain frequency characteristics of a waveform obtained by squaring the amplitude described in FIGS. 35 and 36. H5 of FIG. 39 is gain frequency characteristics of the low-pass filter described in H2 of FIG. 30. In order to make the waveform have single-peak characteristics, it is necessary to attenuate a portion in which the vibration frequency is double (for example, about 156 Hz) in the square waveform of the amplitude illustrated in H4 of FIG. 39. That is, it is necessary to sufficiently attenuate the Q value portion shown in H6 of FIG. 39 by low-pass filter processing of H5. The low-pass filter illustrated in H5 of FIG. 39 is a moving average low-pass filter having the same section length as a period (for example, a period corresponding to about 76 Hz) of the vibration frequency. By performing the low-pass filter processing of H5 on the square waveform of the amplitude illustrated in FIG. 35, the frequency characteristics of the waveform after low-pass filter processing become characteristics as illustrated in FIG. 38, and the emphasized waveform by a covariance can be made into a single-peak waveform as illustrated in FIG. 37.

As described above, in order to make the emphasized waveform by the covariance into a single-peak waveform, it is necessary to sufficiently attenuate the portion illustrated in H6 of FIG. 39 in which the amplitude is squared to be doubled vibration frequency, by low-pass filter processing. Accordingly, the single-peak waveform can be obtained by setting the section length in the square envelope of the amplitude waveform or the self-covariance of the same section to a section length equal to or longer than the period (wavelength λ) of the driving frequency. However, when the section length becomes long, the top of the emphasized waveform is flattened, and the detection accuracy of the time measured based on the emphasized waveform is deteriorated. Accordingly, the minimum section length in which the waveform becomes a single-peak waveform is the optimum section length. A method is also considered using a low-pass filter optimized to attenuate a Q-value portion in which the vibration frequency is doubled. In this case, after obtaining the square envelope of the amplitude waveform or the self-covariance of the same section, the single-peak waveform can be obtained by performing low-pass filter processing of the shape the same or different from these processing sections.

As described above, the measurement device of the embodiment includes the data acquisition unit that acquires the data stream obtained in time series by the first sensor provided in the structure and represents the impact given to the structure by the movement of the moving object, and the processing unit that obtains a covariance based on the data streams and detects the timing of the impact given to the structure by the movement of the moving object based on the covariance.

According to the embodiment, the first sensor is provided in the structure and time-series data stream representing the impact given to the structure by the movement of the moving object is obtained, by using the first sensor. The covariance based on the acquired data streams is obtained, and the timing of the impact given to the structure by the movement of the moving object is detected based on the obtained covariance. By using the covariance in this way, the peak of the impact waveform can be clearly distinguished from other noises and detected. The peak of the impact waveform corresponds to the timing of the impact given to the structure by the movement of the moving object. Accordingly, according to the embodiment, the timing of the impact given to the structure by the movement of the moving object can be appropriately detected.

In the embodiment, the processing unit may obtain the self-covariance of the data stream as the covariance and may detect the timing of the impact based on the self-covariance.

In this way, a covariance can be obtained by simple processing based on the data stream from the first sensor.

In the embodiment, the processing unit may obtain a self-covariance of the data streams in the same section as a covariance.

In this way, since the self-covariance can be obtained by using the same data stream in the same section, the amount of data required for obtaining the covariance can be reduced.

Further, in the embodiment, the processing unit may obtain the square envelope of the amplitude waveform of the impact as the self-covariance.

In this way, the square envelope of the amplitude waveform can be obtained as the self-covariance of the data streams in the same section.

Further, in the embodiment, the processing unit may obtain a self-covariance by performing high-pass filter processing on the data stream, obtaining a value obtained by squaring the data stream subjected to the high-pass filter processing, and performing low-pass filter processing on the squared value.

In this way, the square envelope of the amplitude waveform can be obtained as the self-covariance by simple processing using the high-pass filter processing and the low-pass filter processing.

Further, in the embodiment, the data acquisition unit may acquire a second data stream obtained in time series by a second sensor provided at a position different from the position where a first sensor is provided in the structure and representing the impact of the structure due to the movement of the moving object, and the processing unit may obtain a covariance between a first data stream which is the data stream and the second data stream.

In this way, the covariance is obtained by using the first data stream obtained from the first sensor and the second data stream obtained from the second sensor, and the timing of the impact can be detected based on the obtained covariance.

Further, in the embodiment, the data stream is a data stream of acceleration, and the processing unit may obtain a covariance between the data stream of the acceleration and the data stream of a velocity obtained from the data stream of the acceleration.

In this way, it is possible to obtain a covariance based on the data stream of the acceleration from one sensor.

Further, in the embodiment, the processing unit may obtain the intensity of the impact at the timing of the impact based on the covariance.

By obtaining the intensity of the impact in this way, the obtained intensity can be utilized for various processing.

Further, in the embodiment, the processing unit may perform bandpass filter processing on the data stream to obtain a covariance based on the data stream after bandpass filter processing.

By obtaining a covariance based on the data stream after bandpass filter processing in this way, clear peak detection becomes possible, and appropriate detection of the impact timing becomes possible.

Further, in the embodiment, the bandpass filter processing may be processing for passing a frequency bandwidth where the gain of the response frequency characteristics of the impact is larger than 1.

In this way, it is possible to perform emphasis processing based on the covariance by allowing the signal of the frequency bandwidth corresponding to the vibration frequency of the impact waveform to pass through by the bandpass filter processing.

Further, in the embodiment, the processing unit may obtain a covariance in a section including one wavelength of the waveform of the impact.

In this way, it is possible to suppress that the peak waveform being the emphasized waveform becomes a double-peak waveform, and to more accurately detect the impact timing.

Further, in the embodiment, the processing unit may obtain a covariance in a section having a section length shorter than two wavelengths of the waveform of the impact.

In this way, it is possible to suppress that a peak waveform as an emphasized waveform becomes a broad waveform, and to appropriately detect the impact timing.

Further, in the embodiment, the processing unit may obtain a covariance in a section having a section length in which the emphasized waveform by a covariance becomes a single-peak waveform.

In this way, since the impact timing can be detected by the emphasized waveform of the single-peak waveform, the impact timing can be detected more accurately.

Further, in the embodiment, the processing unit adjusts the offset of the section for obtaining covariance so that the peak timing of the emphasized waveform by the covariance matches the impact occurrence timing.

By doing so, the peak timing of the emphasized waveform and the impact occurrence timing can be matched, thereby improving the measurement accuracy.

Further, in the embodiment, the first sensor is provided in the passing area of the moving object in the structure, and the processing unit may detect the timing of the moving object passing the passing area by detecting the timing of the impact.

In this way, it is possible to specify at which timing the moving object passed through the passing area, and to realize various kinds of processing using the passing timing. Further, in the embodiment, the processing unit may perform axle detection of the moving object based on the covariance.

By performing the axle detection of the moving object based on the covariance in this way, it is possible to perform the axle detection accurately and without omission.

In addition, the embodiment relates to a measurement system including the measurement device and the first sensor.

Although the embodiment has been described in detail as described above, it will be easy for a person skilled in the art to understand that many modifications can be made without departing from the novel matters and effects of the present disclosure. Therefore, all such modifications are intended to be within the scope of the present disclosure. For example, a term described at least once together with a different term having a broader meaning or the same meaning in the specification or the drawings can be replaced with the different term anywhere in the specification or the drawings. All combinations of the embodiment and the modified examples are also included in the scope of the present disclosure. Further, the configuration and operation of the measurement device and the measurement system are not limited to those described in the embodiment, and various modifications can be made.

What is claimed is:

1. A measurement device comprising:
    a data acquisition unit acquiring a data stream that is obtained in time series by a first sensor provided in a structure and that represents an impact given to the structure by a movement of a moving object; and
    a processing unit obtaining a covariance based on the data stream and detecting a timing of the impact given to the structure by the movement of the moving object, based on the covariance.

2. The measurement device according to claim 1, wherein the processing unit obtains a self-covariance of the data stream as the covariance, and detects a timing of the impact based on the self-covariance.

3. The measurement device according to claim 2, wherein the processing unit obtains the self-covariance of the data stream in the same section, as the covariance.

4. The measurement device according to claim 2, wherein the processing unit obtains a square envelope of an amplitude waveform of the impact as the self-covariance.

5. The measurement device according to claim 4, wherein the processing unit performs high-pass filter processing on the data stream, acquires a value obtained by squaring the data stream subjected to the high-pass filter processing, and performs low-pass filter processing on the squared value, thereby obtaining the self-covariance.

6. The measurement device according to claim 1, wherein the data acquisition unit acquires a second data stream obtained in time series by a second sensor provided at a position different from a position in which the first sensor is provided in the structure, and representing the impact on the structure by the movement of the moving object, and
the processing unit obtains the covariance between a first data stream which is the data stream and the second data stream.

7. The measurement device according to claim 1, wherein the data stream is a data stream of an acceleration, and the processing unit obtains the covariance between the data stream of the acceleration and a data stream of a velocity obtained from the data stream of the acceleration.

8. The measurement device according to claim 1, wherein the processing unit obtains an intensity of the impact at a timing of the impact, based on the covariance.

9. The measurement device according to claim 1, wherein the processing unit performs bandpass filter processing on the data stream and obtains the covariance based on the data stream subjected to the bandpass filter processing.

10. The measurement device according to claim 9, wherein the bandpass filter processing is processing for passing a frequency bandwidth in which a gain of response frequency characteristics of the impact is larger than 1.

11. The measurement device according to claim 1, wherein the processing unit obtains the covariance in a section including one wavelength of a waveform of the impact.

12. The measurement device according to claim 11, wherein
the processing unit obtains the covariance in a section having a section length shorter than two wavelengths of the waveform of the impact.

13. The measurement device according to claim 1, wherein
the processing unit obtains the covariance in a section having a section length in which an emphasized waveform by the covariance becomes a single-peak waveform.

14. The measurement device according to claim 1, wherein
the processing unit performs offset adjustment of a section for obtaining the covariance such that a peak timing of an emphasized waveform by the covariance matches an impact occurrence timing.

15. The measurement device according to claim 1, wherein
the first sensor is provided in an area through which the moving object passes in the structure, and
the processing unit detects the timing of the impact to detect a timing at which the moving object passes through the passing area.

16. The measurement device according to claim 1, wherein
the processing unit performs detection of an axle of the moving object based on the covariance.

17. A measurement system comprising:
the measurement device according to claim 1; and
the first sensor.

* * * * *